United States Patent
Jain et al.

(10) Patent No.: US 12,412,318 B2
(45) Date of Patent: Sep. 9, 2025

(54) MODIFYING DIGITAL IMAGES VIA OBJECT-BASED ALIGNMENT ACROSS MULTIPLE PERSPECTIVES

(71) Applicant: Adobe Inc., San Jose, CA (US)

(72) Inventors: Ashish Jain, Delhi (IN); Arushi Jain, Delhi (IN)

(73) Assignee: Adobe Inc., San Jose, CA (US)

( * ) Notice: Subject to any disclaimer, the term of this patent is extended or adjusted under 35 U.S.C. 154(b) by 332 days.

(21) Appl. No.: 18/328,363

(22) Filed: Jun. 2, 2023

(65) Prior Publication Data
US 2024/0404122 A1    Dec. 5, 2024

(51) Int. Cl.
*G06T 11/00* (2006.01)
*G06F 3/04845* (2022.01)
*G06T 7/30* (2017.01)

(52) U.S. Cl.
CPC .......... *G06T 11/00* (2013.01); *G06F 3/04845* (2013.01); *G06T 7/30* (2017.01); *G06T 2200/24* (2013.01); *G06T 2207/20092* (2013.01)

(58) Field of Classification Search
None
See application file for complete search history.

(56) References Cited

U.S. PATENT DOCUMENTS

2008/0317387 A1*  12/2008  Berger ............... G06T 11/60
                                                      382/309

OTHER PUBLICATIONS

Adobe, Create and edit perspective grid—Learn how to define and edit a perspective grid and modify its widgets and points to get started with perspective drawing in Illustrator. Retrieved from the Internet on Aug. 31, 2023: URL: https://helpx.adobe.com/illustrator/using/perspective-drawing.html.

* cited by examiner

*Primary Examiner* — Edward Martello
(74) *Attorney, Agent, or Firm* — Keller Preece PLLC

(57) ABSTRACT

The present disclosure relates to systems, methods, and non-transitory computer readable media that align objects of a digital image across different perspectives portrayed therein. For instance, in one or more embodiments, the disclosed systems detect one or more user interactions for moving a first object within a first perspective of a digital image. Additionally, the disclosed systems determine a modified alignment of the first object within the first perspective by mapping an alignment of a second object portrayed within a second perspective of the digital image to the first perspective. The disclosed systems further modify the digital image by positioning the first object within the first perspective in accordance with the modified alignment.

20 Claims, 12 Drawing Sheets

MODIFYING DIGITAL IMAGES VIA OBJECT-BASED ALIGNMENT ACROSS MULTIPLE PERSPECTIVES

BACKGROUND

Recent years have seen significant advancement in hardware and software platforms for editing digital images. Indeed, as the use of digital images has become increasingly ubiquitous, systems have developed to facilitate the manipulation of the content within such digital images. For instance, in the field of digital image editing, computer-implemented tools or algorithms can be implemented to manipulate objects in accordance with a perspective portrayed within a digital image. Despite these advancements, several technical problems exist with respect to aligning objects within a digital image based on a perspective. Specifically, digital image editing approaches often fail to accommodate the alignment of objects portrayed in different perspectives of a digital image, leading to inaccurate alignment and unrealistic results.

SUMMARY

One or more embodiments described herein provide benefits and/or solve one or more of the foregoing or other problems in the art with systems, methods, and non-transitory computer-readable media that implement object-based alignment for modifying digital images to align objects that are portrayed within different perspectives. In particular, in one or more embodiments, the disclosed systems generate and provide perspective-aware guides and/or snapping across two different perspectives portrayed within a digital image based on the positioning of an object within at least one of those perspectives. To illustrate, in some implementations, the disclosed systems extract snappable segments from the perspective bounding boxes of objects portrayed across different perspectives of a digital image. The disclosed systems further structure the extracted snappable segments in accordance with the perspective view of their respective object. Using this structure, the disclosed systems determine an alignment position for an object being moved within its perspective based on the positioning of another object within another perspective. In this manner, the disclosed systems flexibly position the moved object within its perspective to create an accurate, consistent alignment with the other object in the other perspective.

Additional features and advantages of one or more embodiments of the present disclosure are outlined in the following description.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
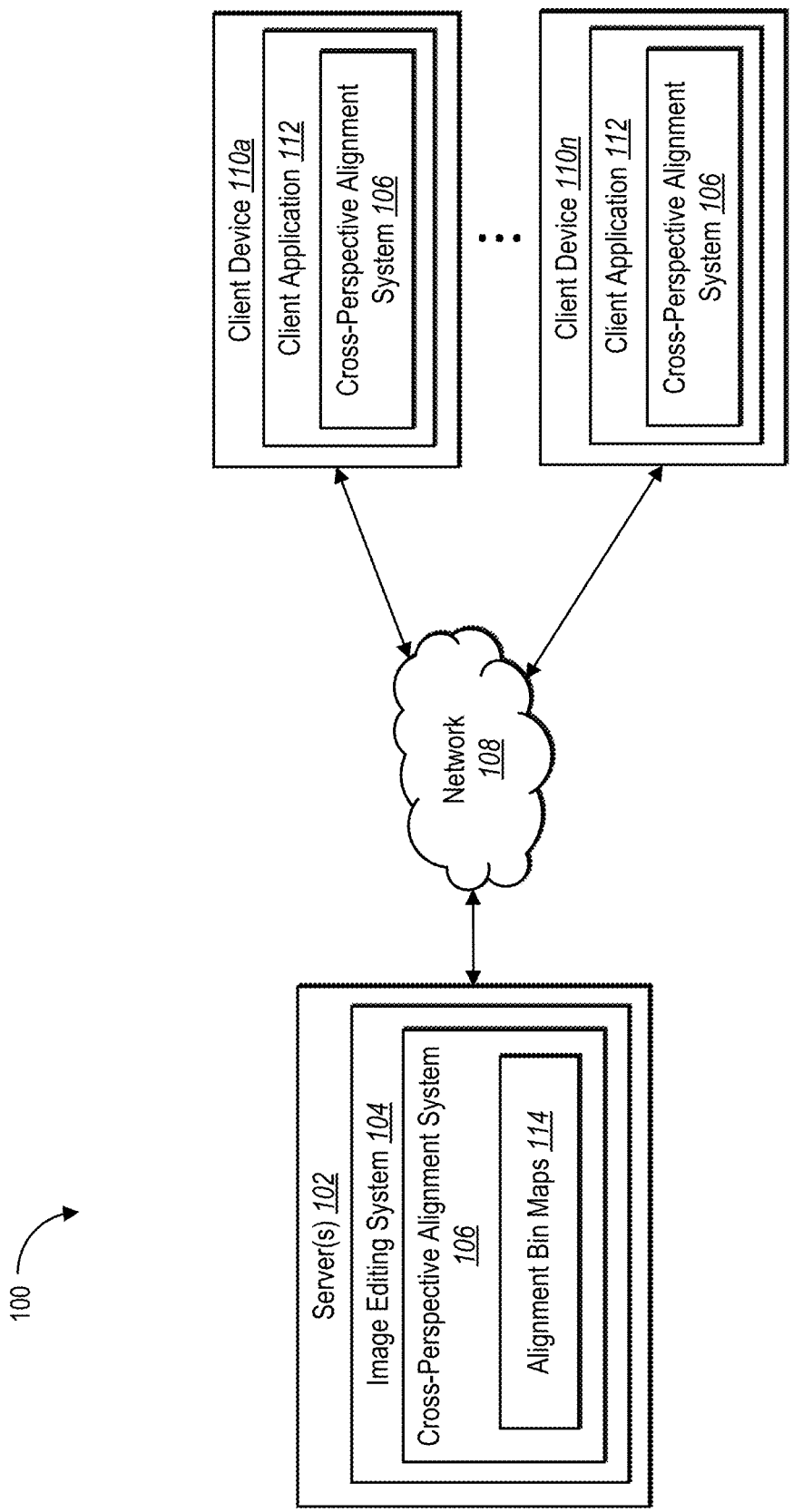
FIG. 1 illustrates an example environment in which a cross-perspective alignment system operates in accordance with one or more embodiments.

One or more embodiments described herein include a cross-perspective alignment system that modifies a digital image to position an object within one perspective based on a determined alignment for the object with another object within a different perspective. Conventional perspective-based object positioning systems suffer from several technological shortcomings that result in inflexible, inaccurate, and inefficient operation. For instance, conventional systems are inflexible in that they often fail to facilitate the alignment of objects across different perspectives. To illustrate, conventional systems often restrict the positioning of an object within a perspective based on a grid created for that perspective. Indeed, many conventional systems generate a grid having grid lines that follow the perspective of a digital image. Such systems, however, often require that an object moved within that perspective align with the grid lines. For example, such systems typically prevent an object from being moved within its perspective so that its borders (or the borders of its bounding box) fall between grid lines and may force the object to the grid lines via a snapping operation. Where a digital image portrays multiple perspectives, limiting object positioning to the grid lines often prevents an object from being moved within one perspective to align with another object within another perspective, particularly where the borders of the other object inherently fall between the grid lines when the grid for its perspective is created. In many instances, these systems require adjusting the dimensions of a moved object to achieve some degree of alignment to the grid.

Further, conventional perspective-based object positioning systems often fail to operate accurately. In particular, conventional systems typically fail to accurately align objects across different perspectives of a digital image, leading to unrealistic image results. For instance, by requiring positioning of a moved object in accordance with grid lines, conventional systems often fail to accurately align the boundaries of objects across different perspectives, resulting in a digital image having an unnatural perspective appearance. Rather than using the perspective-based grids, some conventional systems enable free movement of an object within a perspective of a digital image. Such systems, however, are imprecise and subject to user error, resulting in similar inaccuracies as the grid approach.

In addition to problems of inflexibility and inaccuracy, conventional perspective-based object positioning systems also experience problems of inefficiency. For instance, conventional systems that utilize perspective-based grids are often inefficient as they must maintain and search through a large pool of grid lines to find a grid line appropriate for a moving object. Thus, these systems typically consume a significant amount of computing resources (e.g., memory or processing power) to facilitate movement of objects within a perspective.

In one or more embodiments, the cross-perspective alignment system utilizes an object-based alignment to facilitate the alignment of objects across different perspectives of a digital image. To illustrate, in one or more embodiments, the cross-perspective alignment system extracts snappable line segments from the objects of a digital image and generates an alignment bin map for each perspective portrayed therein. The cross-perspective alignment system further structures the snappable line segments of each object using the alignment bin map that corresponds to its perspective. When an object is moved within a perspective, the cross-perspective alignment system utilizes the structuring within the alignment bin maps to identify a position that aligns the object with another object portrayed in a different perspective. In some cases, the cross-perspective alignment system recommends and/or snaps the object to that position.

To illustrate, in one or more embodiments, the cross-perspective alignment system detects one or more user interactions for moving a first object within a first perspective of a digital image. Further, the cross-perspective alignment system determines a modified alignment of the first object within the first perspective by mapping an alignment of a second object portrayed within a second perspective of the digital image to the first perspective. The cross-perspective alignment system modifies the digital image by positioning the first object within the first perspective in accordance with the modified alignment.

As indicated above, in one or more embodiments, the cross-perspective alignment system aligns objects within a digital image across multiple perspectives portrayed therein. In particular, in some embodiments, the cross-perspective alignment system positions an object portrayed within a first perspective of the digital image to align the object with another object portrayed within a second perspective of the digital image. Accordingly, the cross-perspective alignment system positions the object within the first perspective based on the positioning of the other object within the second perspective.

Indeed, as mentioned above, in one or more embodiments, the cross-perspective alignment system extracts one or more snappable line segments from each object portrayed within a digital image. In particular, in some embodiments, the cross-perspective alignment system extracts one or more snappable line segments for each object from the perspective bounding box associated with the object.

Further, as previously mentioned, in one or more embodiments, the cross-perspective alignment system generates one or more alignment bin maps for a digital image. For instance, in some implementations, the cross-perspective alignment system generates an alignment bin map for each perspective portrayed within the digital image. To illustrate, in some embodiments, the cross-perspective alignment system generates an alignment bin map for a perspective of the digital image by dividing the perspective into multiple alignment bins utilizing a tolerance angle and a horizontal reference line.

In some implementations, the cross-perspective alignment system utilizes the alignment bin map generated for each perspective to sort the extracted snappable line segments associated with that perspective. In particular, the cross-perspective alignment system utilizes the alignment bin map generated for a perspective to organize the snappable line segments extracted from the one or more objects that are positioned within that perspective. For instance, in some cases, the cross-perspective alignment system associates a snappable line segment with an alignment bin of the corresponding alignment bin map based on the angle of the snappable line segment with respect to a horizontal reference line.

As further mentioned, in one or more embodiments, the cross-perspective alignment system determines a modified alignment for an object portrayed within a first perspective to align the object with another object portrayed within a second perspective. In particular, in some embodiments, the cross-perspective alignment system determines a modified alignment for an object being moved within a first perspective that results in alignment with another object portrayed within a second perspective. In some cases, the cross-perspective alignment system selects an object within the second perspective for alignment with the moving object and determines the modified alignment for the moving object accordingly.

In some embodiments, the cross-perspective alignment system selects the object within the second perspective for alignment (and determines the modified alignment) based on the angles of the snappable line segments of the objects. In some implementations, the cross-perspective alignment system selects the object within the second perspective (and determines the modified alignment) utilizing the alignment bin maps generated for each perspective. To illustrate, in some cases, the cross-perspective alignment system selects the object within the second perspective based on the index of the object within its alignment bin map and the index of the moving object within its alignment bin map.

In some embodiments, upon selecting an object within the second perspective for alignment with the moving object in the first perspective (and determining the modified alignment), the cross-perspective alignment system provides a recommendation for the modified alignment. For example, in some cases, the cross-perspective alignment system generates and provides a perspective guide for display within a graphical user interface of a client device displaying the digital image to indicate a positioning for the moving object that results in the alignment. In some implementations, the cross-perspective alignment system snaps (e.g., moves) the moving object to a location within the first perspective that aligns the moving object with the other object selected for alignment.

The cross-perspective alignment system provides several advantages over conventional systems. For example, the cross-perspective alignment system improves the flexibility of implementing computing devices when compared to conventional systems by aligning objects across different perspectives portrayed within a digital image. Indeed, by determining a modified alignment for an object within a first perspective based on the positioning of another object within a second perspective, the cross-perspective alignment system flexibly positions the object within the first perspective to align with the other object in the second perspective. Further, by utilizing the angles of extracted snappable line segments and/or alignment bin maps to determine a modified alignment for an object, the cross-perspective alignment system offers a grid-free approach to aligning objects within a perspective and facilitates alignment without the need to adjust the dimensions of an object.

Additionally, the cross-perspective alignment system improves the accuracy of implementing computing devices when compared to conventional systems. Indeed, while conventional systems position objects based on grid lines generated for a perspective or based on manual user movement, the cross-perspective alignment system offers an automated approach to object positioning by mapping an alignment of an object in one perspective to another perspective. Thus, the cross-perspective alignment system avoids the limited placement options associated with perspective-based grids and the imprecision of user input. Accordingly, the cross-perspective alignment system implements an approach to object positioning that facilitates the consistent alignment of objects across different perspectives, leading to a more natural perspective appearance within digital images.

Further, the cross-perspective alignment system improves the efficiency of implementing computing devices when compared to conventional systems. Indeed, by determining a modified alignment for an object using alignment bin maps generated for a digital image, the cross-perspective alignment system implements a more efficient alignment approach. In particular, alignment bin maps offer a smaller search pool when compared to the perspective-based grids of conventional systems, allowing the cross-perspective alignment system to more quickly determine how to position an object for alignment, reducing the computing resources consumed in the process.

Additional details regarding the cross-perspective alignment system will now be provided with reference to the figures. For example, FIG. 1 illustrates a schematic diagram of an exemplary system environment ("environment") 100 in which a cross-perspective alignment system 106 operates. As illustrated in FIG. 1, the environment 100 includes a server(s) 102, a network 108, and client devices 110a-110n.

Although the environment 100 of FIG. 1 is depicted as having a particular number of components, the environment 100 is capable of having any number of additional or alternative components (e.g., any number of servers, client devices, or other components in communication with the cross-perspective alignment system 106 via the network 108). Similarly, although FIG. 1 illustrates a particular arrangement of the server(s) 102, the network 108, and the client devices 110a-110n, various additional arrangements are possible.

The server(s) 102, the network 108, and the client devices 110a-110n are communicatively coupled with each other either directly or indirectly (e.g., through the network 108 discussed in greater detail below in relation to FIG. 9). Moreover, the server(s) 102 and the client devices 110a-110n include one of a variety of computing devices (including one or more computing devices as discussed in greater detail with relation to FIG. 9).

As mentioned above, the environment 100 includes the server(s) 102. In one or more embodiments, the server(s) 102 generates, stores, receives, and/or transmits data including digital images and/or modified digital images. In one or more embodiments, the server(s) 102 comprises a data server. In some implementations, the server(s) 102 comprises a communication server or a web-hosting server.

In one or more embodiments, the image editing system 104 provides functionality by which a client device (e.g., a user of one of the client devices 110a-110n) generates, edits, manages, and/or stores digital images. For example, in some instances, a client device sends a digital image to the image editing system 104 hosted on the server(s) 102 via the network 108. The image editing system 104 then provides many options that the client device may use to edit the digital image, store the digital image, and subsequently search for, access, and view the digital image. For instance, in some cases, the image editing system 104 provides one or more options that the client device may use to align objects across different perspectives portrayed within a digital image.

Additionally, the server(s) 102 includes the cross-perspective alignment system 106. In one or more embodiments, via the server(s) 102, the cross-perspective alignment system 106 modifies digital images to align objects across different perspectives portrayed therein. For instance, in some cases, the cross-perspective alignment system 106, via the server(s) 102, generates alignment bin maps 114 for the perspectives of a digital image, associates each object portrayed in the digital image with a corresponding alignment bin map, determines a modified alignment that aligns an object of one perspective with an object of another perspective using the alignment bin maps 114, and modifies the digital image by positioning the object in accordance with the modified alignment. Example components of the cross-perspective alignment system 106 will be described below with regard to FIG. 7.

In one or more embodiments, the client devices 110a-110n include computing devices that can access, edit, implement, modify, store, and/or provide, for display, digital images. For example, the client devices 110a-110n include smartphones, tablets, desktop computers, laptop computers, head-mounted-display devices, or other electronic devices. The client devices 110a-110n include one or more applications (e.g., the client application 112) that can access, edit, implement, modify, store, and/or provide, for display, digital images. For example, in some embodiments, the client application 112 includes a software application installed on the client devices 110a-110n. In other cases, however, the client application 112 includes a web browser or other application that accesses a software application hosted on the server(s) 102.

The cross-perspective alignment system 106 can be implemented in whole, or in part, by the individual elements of the environment 100. Indeed, as shown in FIG. 1 the cross-perspective alignment system 106 can be implemented with regard to the server(s) 102 and/or at the client devices 110a-110n. In particular embodiments, the cross-perspective alignment system 106 on the client devices 110a-110n comprises a web application, a native application installed on the client devices 110a-110n (e.g., a mobile application, a desktop application, a plug-in application, etc.), or a cloud-based application where part of the functionality is performed by the server(s) 102.

In additional or alternative embodiments, the cross-perspective alignment system 106 on the client devices 110a-110n represents and/or provides the same or similar functionality as described herein in connection with the cross-perspective alignment system 106 on the server(s) 102. In some implementations, the cross-perspective alignment system 106 on the server(s) 102 supports the cross-perspective alignment system 106 on the client devices 110a-110n.

In some embodiments, the cross-perspective alignment system 106 includes a web hosting application that allows the client devices 110a-110n to interact with content and services hosted on the server(s) 102. To illustrate, in one or more implementations, the client devices 110a-110n accesses a web page or computing application supported by the server(s) 102. The client devices 110a-110n provide input to the server(s) 102, such as a digital image and/or input for moving an object within a perspective of the digital image. In response, the cross-perspective alignment system 106 on the server(s) 102 utilizes the provided input to generate a recommendation for a positioning of the object that aligns the object with another object portrayed within another perspective of the digital image. The server(s) 102 then provides the recommendation (e.g., a perspective guide or snapped location) to the client devices 110a-110n.

In some embodiments, though not illustrated in FIG. 1, the environment 100 has a different arrangement of components and/or has a different number or set of components altogether. For example, in certain embodiments, the client devices 110a-110n communicate directly with the server(s) 102 bypassing the network 108. As another example, the environment 100 includes a third-party server comprising a content server and/or a data collection server.

Figure 2:
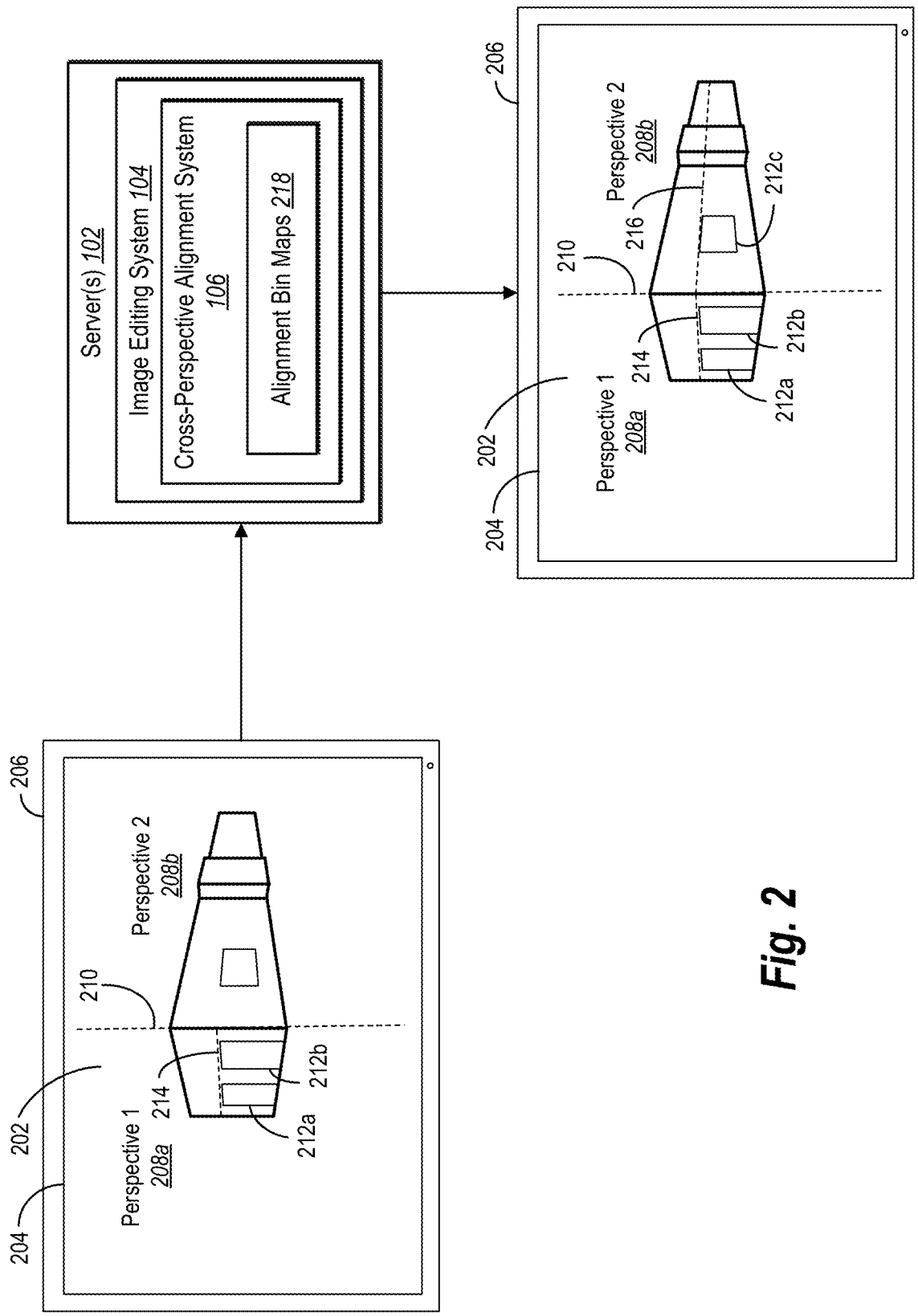
FIG. 2 illustrates an overview diagram of the cross-perspective alignment system aligning objects across different perspectives in accordance with one or more embodiments.

As mentioned in one or more embodiments, the cross-perspective alignment system 106 aligns objects across different perspectives portrayed within a digital image. FIG. 2 illustrates an overview diagram of the cross-perspective alignment system 106 aligning objects across different perspectives in accordance with one or more embodiments.

Indeed, as shown in FIG. 2, the cross-perspective alignment system 106 provides a digital image 202 for display within a graphical user interface 204 of a client device 206. As illustrated, the digital image 202 portrays a first perspective 208a and a second perspective 208b (divided by the dashed line 210). Further, the digital image 202 portrays a first object 212a and a second object 212b within the first perspective 208a. As shown, the first object 212a and the second object 212b are aligned in that their horizontal lines are aligned in accordance with the first perspective 208a (as illustrated by the dashed line 214).

In one or more embodiments, an alignment for an object includes a positioning of the object with respect to a reference (e.g., a reference point or reference line). To illustrate, in some cases, where an object is portrayed within a particular perspective of a digital image, an alignment of the object includes a positioning of the object with respect to a reference line that extends to a vanishing point of that perspective (e.g., a perspective line of that perspective). In some embodiments, an alignment includes a positioning of an object so that a portion of the object or a portion of a bounding box (e.g., a perspective bounding box) associated with the object aligns with (e.g., is collinear with) the reference. In some implementations, the reference used for alignment includes or is associated with another object, including an object portrayed within the same perspective or an object portrayed in another perspective. The alignment of an object with respect to another object portrayed in another perspective will be discussed in more detail below.

As shown in FIG. 2, the cross-perspective alignment system 106 modifies the digital image 202 by positioning a third object 212c within the second perspective 208b. In some cases, the third object 212c includes a new object that has been added to the digital image. In some implementations, the third object 212c includes an object that was previously portrayed within the digital image 202 but at a different location.

In particular, as shown in FIG. 2, the cross-perspective alignment system 106 positions the third object 212c within the second perspective 208b to align the third object 212c with the first object 212a and the second object 212b of the first perspective 208a. In particular, the third object 212c is aligned with the first object 212a and the second object 212b in that the third object 212c is positioned in accordance with an alignment (as represented by the line 216) that corresponds to the alignment of the first object 212a and the second object 212b. Indeed, as will be explained in more detail below, in one or more embodiments, the cross-perspective alignment system 106 maps the alignment of the first object 212a and the second object 212b from the first perspective 208a to the second perspective 208b and positions the third object 212c within the second perspective 208b in accordance with the mapped perspective. That is, the cross-perspective alignment system 106 determines a modified alignment for the third object 212c within the second perspective 208b by mapping the alignment of the first object 212a and the second object 212b to the second perspective 208b and positions the third object 212c within the second perspective 208b. in accordance with the modified alignment.

As shown in FIG. 2, the cross-perspective alignment system 106 utilizes alignment bin maps 218 in aligning the third object 212c with the first object 212a and the third object 212c. In one or more embodiments, an alignment bin map includes a mapping of a portion of a digital image for use in aligning objects within the digital image. In particular, in some embodiments, an alignment bin map includes a mapping of a perspective of a digital image for use in aligning an object within that perspective with another object of another perspective. To illustrate, in some cases, an alignment bin map divides a perspective of a digital image (e.g., the portion of the digital image portrayed in that perspective) into multiple alignment bins.

In one or more embodiments, an alignment bin includes a portion of an alignment bin map. Further, in some embodiments, an alignment bin is associated with one or more indices within an alignment bin map. In some implementations, an alignment bin corresponds to an angle or range of angles with respect to a reference line. Indeed, as will be described in more detail below, in some cases, an alignment bin corresponds to a segment of a digital image associated with a perspective portrayed therein that falls within an angle or range of angles with respect to a reference line for that perspective.

In one or more embodiments, the cross-perspective alignment system 106 generates the alignment bin maps 218 for the digital image 202. For instance, in some embodiments, the cross-perspective alignment system 106 generates the alignment bin maps 218 by generating a first alignment bin map for the first perspective 208a and a second alignment bin map for the second perspective 208b.

Figure 3:
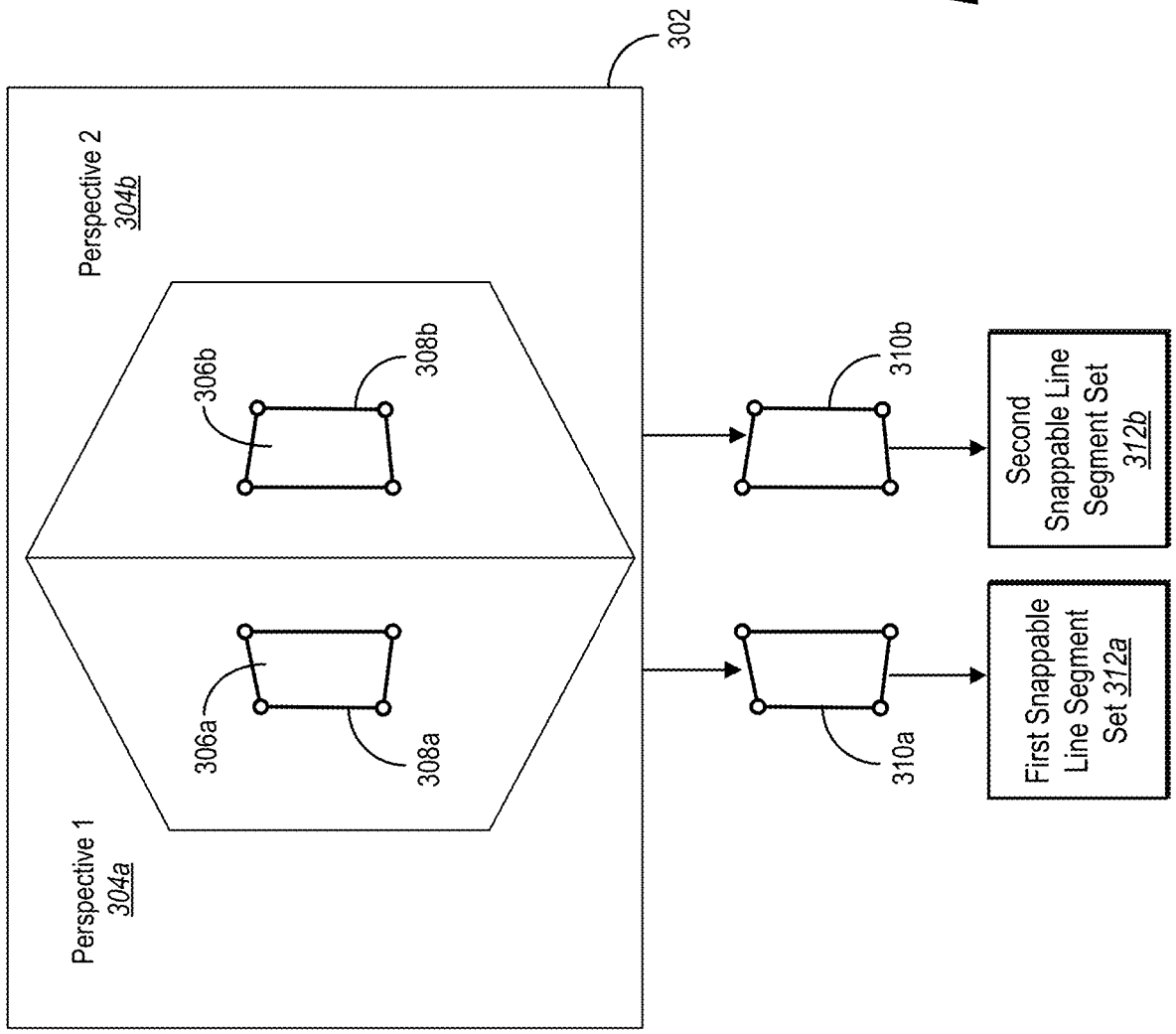
FIG. 3 illustrates the cross-perspective alignment system extracting snappable line segments from objects portrayed in a digital image in accordance with one or more embodiments.

As previously mentioned, in one or more embodiments, the cross-perspective alignment system 106 extracts snappable line segments from objects portrayed within perspectives of a digital image. FIG. 3 illustrates the cross-perspective alignment system 106 extracting snappable line segments from objects portrayed in a digital image in accordance with one or more embodiments.

As shown in FIG. 3, the cross-perspective alignment system 106 analyzes a digital image 302 portraying a first perspective 304a and a second perspective 304b. Additionally, as shown, the digital image 302 portrays a first object 306a within the first perspective 304a and a second object 306b within the second perspective 304b.

As further shown, the first object 306a is associated with a first perspective bounding box 308a, and the second object 306b is associated with a second perspective bounding box 308b. In one or more embodiments, a perspective bounding box includes a bounding box for an object that follows a perspective within which the object is portrayed. In particular, in some embodiments, a perspective bounding box includes a bounding box having at least one boundary that follows the perspective of a corresponding perspective. To illustrate, in some implementations, a perspective bounding box includes a bounding box having at least one boundary that is angle toward a vanishing point of a corresponding perspective and/or follows a perspective line of the corresponding perspective that extends towards its vanishing point.

As illustrated in FIG. 3, the cross-perspective alignment system 106 extracts snappable line segments from each object. In particular, the cross-perspective alignment system 106 extracts snappable line segments 310a from the first object 306a and extract snappable line segments 310b from the second object 306b. As shown, the snappable line segments 310a for the first object 306a correspond to the segments (i.e., boundaries) of the first perspective bounding box 308a. Similarly, the snappable line segments 310b for the second object 306b correspond to the segments (i.e., boundaries) of the second perspective bounding box 308b. Accordingly, in one or more embodiments, the cross-perspective alignment system 106 extracts snappable line segments from an object by extracting the snappable line segments from the perspective bounding box associated with the object.

As further shown in FIG. 3, the cross-perspective alignment system 106 adds the snappable line segments 310a extracted from the first object 306a to a first snappable line segment set 312a. Further, the cross-perspective alignment system 106 adds the snappable line segments 310b extracted from the second object 306b to a second snappable line segment set 312b. In one or more embodiments, the first snappable line segment set 312a corresponds to the first perspective 304a, and the second snappable line segment set 312b corresponds to the second perspective 304b. Thus, in some embodiments, where the digital image 302 portrays multiple objects within the first perspective 304a and/or the second perspective 304b, the cross-perspective alignment system 106 adds all snappable line segments extracted from those objects to the corresponding snappable line segment set.

Figure 4A:
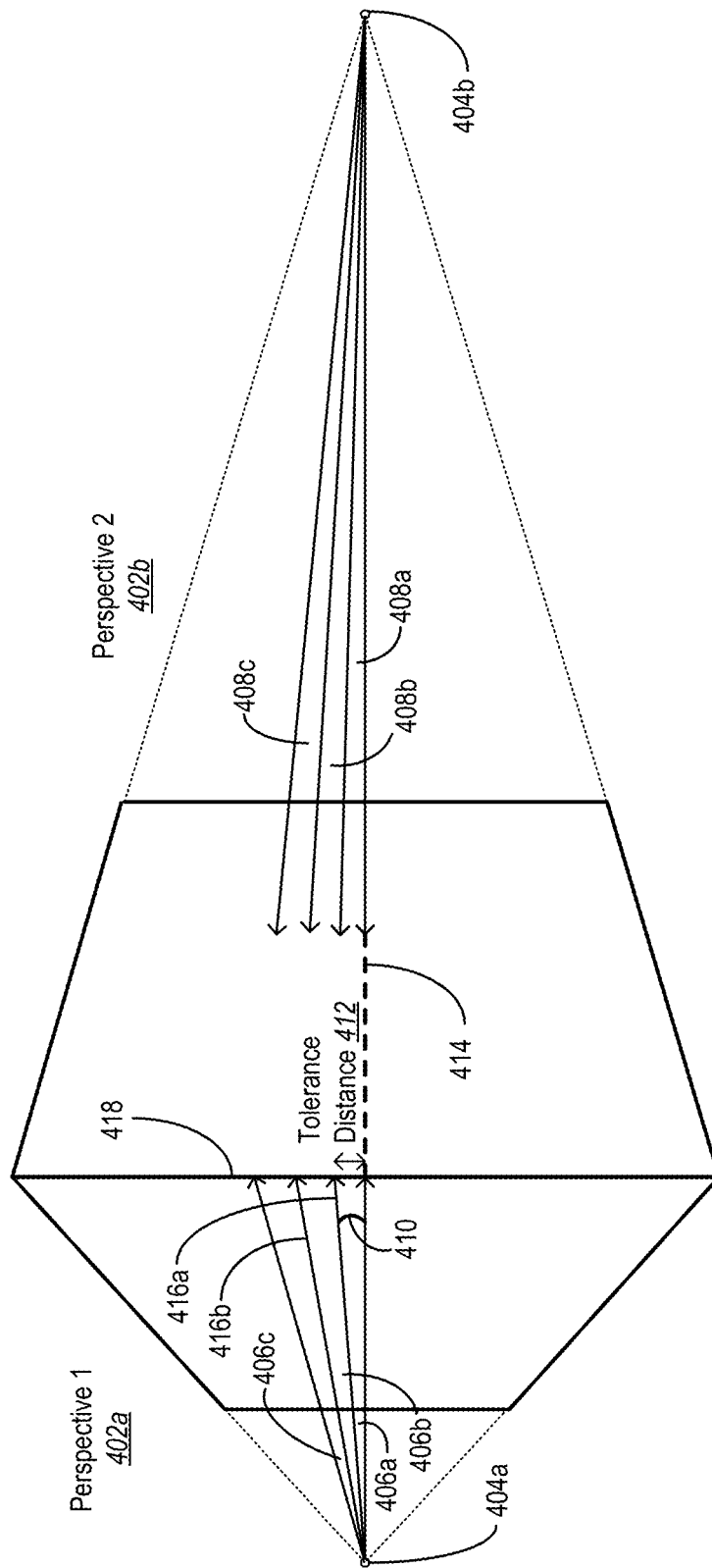
FIGS. 4A-4C illustrate the cross-perspective alignment system generating alignment bin maps for a digital image portraying multiple perspectives in accordance with one or more embodiments.
Figure 4B:
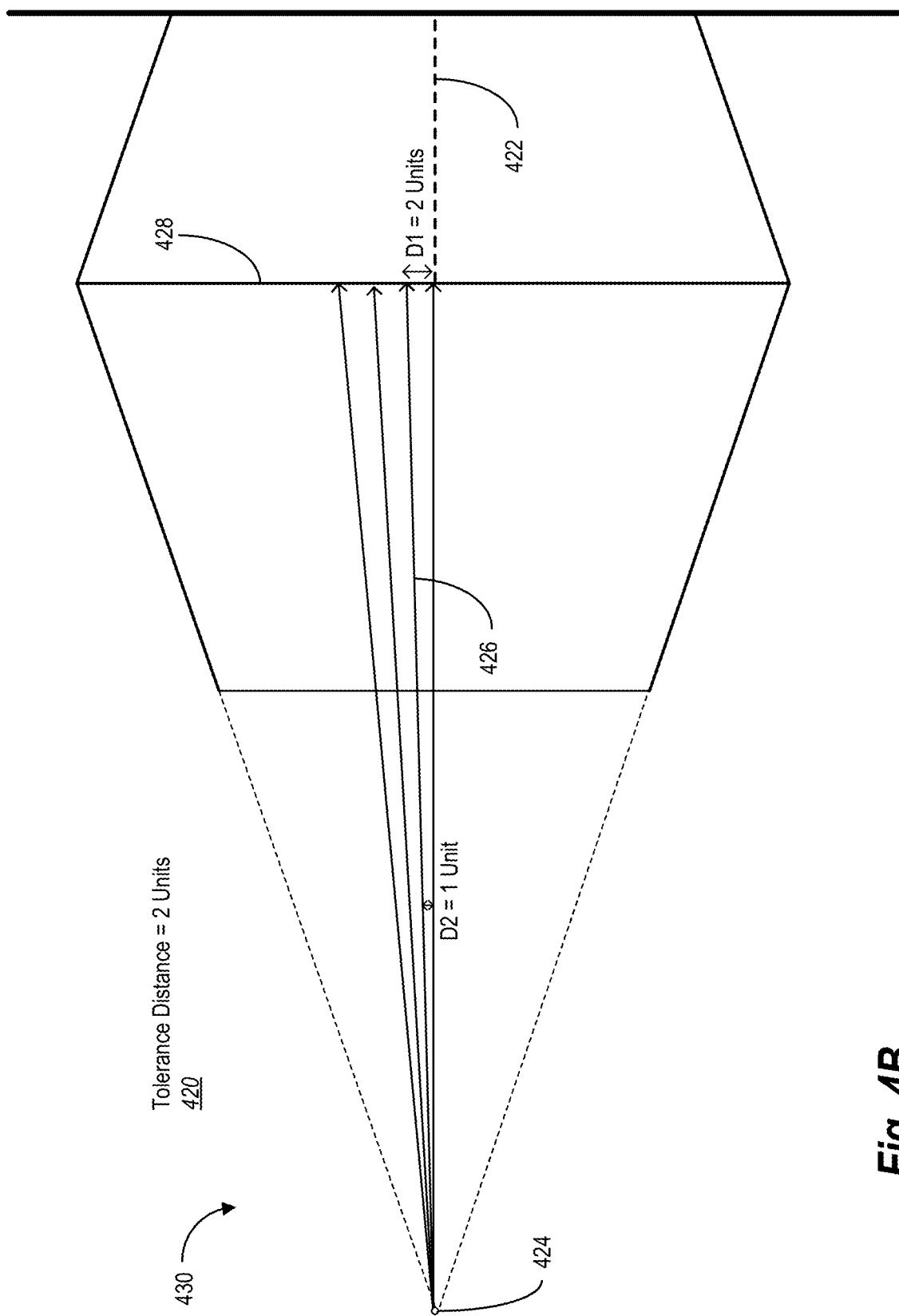
Figure 4C:
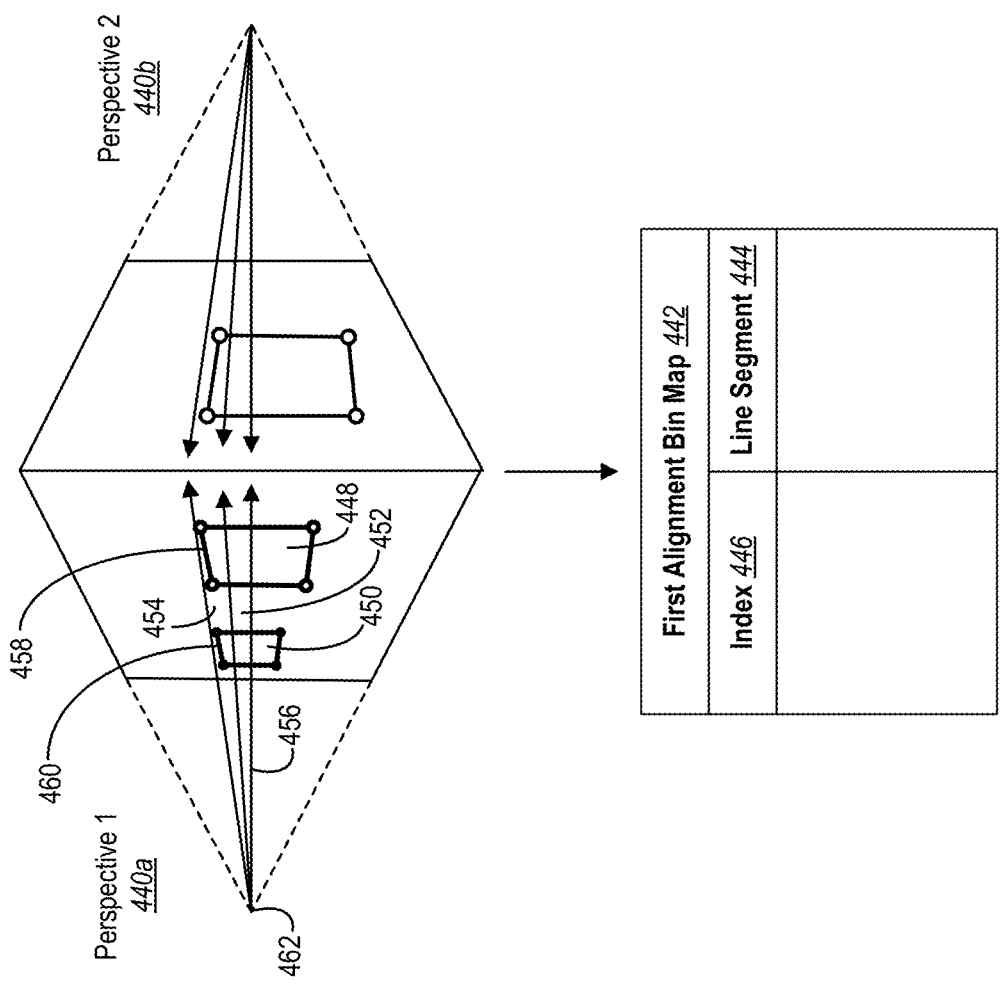

As previously mentioned, in some embodiments, the cross-perspective alignment system 106 generates one or more alignment bin maps for a digital image portraying multiple perspectives. In particular, in some instances, the cross-perspective alignment system 106 generates an alignment bin map for each perspective portrayed within a digital image. FIGS. 4A-4C illustrate the cross-perspective alignment system 106 generating alignment bin maps for a digital image portraying multiple perspectives in accordance with one or more embodiments.

In particular, FIG. 4A illustrates a first perspective 402a and a second perspective 402b. In one or more embodiments, the first perspective 402a and the second perspective 402b are part of a digital image. For instance, in some cases, a digital image portrays a scene that includes the first perspective 402a and the second perspective 402b and further portrays one or more objects in the first perspective 402a and/or the second perspective 402b as part of the scene. As shown, the first perspective 402a is associated with a first vanishing point 404a. Similarly, the second perspective 402b is associated with a second vanishing point 404b.

As previously indicated, in one or more embodiments, the cross-perspective alignment system 106 generates an alignment bin map for each of the first perspective 402a and the second perspective 402b. In some embodiments, the cross-perspective alignment system 106 generates an alignment bin map for a perspective by dividing the perspective (e.g., dividing the portion of the digital image portrayed in that perspective) into a plurality of alignment bins. For example, as shown in FIG. 4A, the cross-perspective alignment system 106 divides the first perspective 402a into a first alignment bin 406a, a second alignment bin 406b, and a third alignment bin 406c. Similarly, the cross-perspective alignment system 106 divides the second perspective 402b into a fourth alignment bin 408a, a fifth alignment bin 408b, and a sixth alignment bin 408c. It should be understood, however, that the number of alignment bins shown in FIG. 4A for each perspective is exemplary. Indeed, the number of alignment bins determined for each perspective differs across various embodiments.

As shown in FIG. 4A, the cross-perspective alignment system 106 divides the first perspective 402a into the first alignment bin 406a, the second alignment bin 406b, and the third alignment bin 406c using a tolerance angle 410. Further, the cross-perspective alignment system 106 utilizes a horizontal reference line 414 in determining the plurality of alignment bins. As shown, the horizontal reference line 414 extends to the first vanishing point 404a associated with the first perspective 402a. Further, the horizontal reference line 414 extends through a center of the first perspective 402a, though the cross-perspective alignment system 106 utilizes horizontal reference lines with different positionings in various embodiments.

To illustrate, in one or more embodiments, the cross-perspective alignment system 106 determines the first alignment bin 406a for the first perspective 402a by determining a first horizontal line 416a that makes an angle with the horizontal reference line 414 that is equal to the tolerance angle 410. In other words, the cross-perspective alignment system 106 determines the first alignment bin 406a by determining a portion of the first perspective 402a (e.g., a portion of the digital image portrayed in the first perspective 402a) that is bounded by the first horizontal line 416a and the horizontal reference line 414 where the angle of the two lines is equal to the tolerance angle 410. As shown in FIG. 4A, the first horizontal line 416a extends to the first vanishing point 404a associated with the first perspective 402a. Thus, the first horizontal line 416a intersects the horizontal reference line 414 at the first vanishing point 404a.

Further, in one or more embodiments, the cross-perspective alignment system 106 determines the second alignment bin 406b for the first perspective 402a by determining a second horizontal line 416b that makes an angle with the first horizontal line 416a that is equal to the tolerance angle 410. In other words, the cross-perspective alignment system 106 determines the second alignment bin 406b by determining a portion of the first perspective 402a that is bounded by the second horizontal line 416b and the first horizontal line 416a where the angle created by the two lines is equal to the tolerance angle 410. As shown in FIG. 4A, the second horizontal line 416b also extends to the first vanishing point 404a. Thus, the second horizontal line 416b intersects the first horizontal line 416a at the first vanishing point 404a.

Said differently, in one or more embodiments, the cross-perspective alignment system 106 determines the second alignment bin 406b by determining the second horizontal line 416b that is at an angle to the horizontal reference line 414 that is equal to double the tolerance angle 410 and associates the portion of the first perspective 402a bounded by the second horizontal line 416b and the first horizontal line 416a with the second alignment bin 406b.

Thus, in some embodiments, the cross-perspective alignment system 106 determines each alignment bin to be bounded by horizontal lines that make an angle equal to the tolerance angle 410. Said differently, in some embodiments, the cross-perspective alignment system 106 determines each alignment bin to be bounded by horizontal lines that make an angle with the horizontal reference line 414 that is equal to a multiple of the tolerance angle 410.

In one or more embodiments, the cross-perspective alignment system 106 determines the tolerance angle 410 using a tolerance distance 412. For instance, in some embodiments, the cross-perspective alignment system 106 determines the tolerance distance 412 and then determines the tolerance angle 410 from the tolerance distance 412. In some instances, the cross-perspective alignment system 106 determines the tolerance distance 412 by receiving the tolerance distance 412 (or a related parameter) from a client device, such as a client device displaying a digital image that portrays the first perspective 402a and the second perspective 402b. In some implementations, the cross-perspective alignment system 106 determines the tolerance distance 412 from one or more user preferences associated with a client device. In some cases, the cross-perspective alignment system 106 utilizes a fixed value for the tolerance distance 412.

As indicated by FIG. 4A, in one or more embodiments, the cross-perspective alignment system 106 also utilizes the horizontal reference line 414 in determining the tolerance angle 410 from the tolerance distance 412. Further, as shown, the cross-perspective alignment system 106 utilizes a vertical reference line 418 in determining the tolerance angle 410. As shown, the vertical reference line 418 is positioned at a point where the first perspective 402a meets the second perspective 402b. In other words, the vertical reference line 418 represents the line where the scene is divided into the two perspectives.

In one or more embodiments, the cross-perspective alignment system 106 determines the tolerance angle 410 using the tolerance distance 412 by determining a horizontal line that is positioned at a vertical distance from the horizontal reference line 414 equal to the tolerance distance 412 at a point where the first perspective 402a and the second perspective 402b meet. In other words, the cross-perspective alignment system 106 determines a horizontal line that is positioned at a vertical distance from the horizontal reference line 414 equal to the tolerance distance 412 at the vertical reference line 418. In some embodiments, the cross-perspective alignment system 106 further determines the angle made by the horizontal line and the horizontal reference line 414 based on their intersection at the first vanishing point 404a and uses that angle as the tolerance angle 410. As an example, FIG. 4A illustrates the first horizontal line 416a at a vertical distance from the horizontal reference line 414 that is equal to the tolerance distance 412 at the vertical reference line 418. Further, FIG. 4A shows that the first horizontal line 416a and the horizontal reference line 414 make an angle that the cross-perspective alignment system 106 utilizes as the tolerance angle 410.

Thus, in one or more embodiments, the cross-perspective alignment system 106 determines a tolerance distance. The cross-perspective alignment system 106 further determines a tolerance angle using the tolerance distance as described above. Additionally, the cross-perspective alignment system 106 utilizes the tolerance angle to generate an alignment bin map for a perspective by dividing the perspective (e.g., a portion of a digital image portrayed in that perspective) into a plurality of alignment bins based on the determined tolerance angle.

In one or more embodiments, the cross-perspective alignment system 106 similarly generates an alignment bin map for the second perspective 402b. For instance, in some embodiments, the cross-perspective alignment system 106 uses the tolerance distance 412 and/or the tolerance angle 410 to generate the alignment bin map for the second perspective 402b (as well as the horizontal reference line 414 and the vertical reference line 418). Indeed, in some implementations, the cross-perspective alignment system 106 utilizes the same parameters for generating an alignment bin map for each perspective portrayed by a digital image. In some instances, however, the cross-perspective alignment system 106 utilizes one or more different parameters for generating each alignment bin map.

Further, while the above discusses generating alignment bin maps for perspectives that are oriented horizontally within a digital image (e.g., the vanishing points and perspective lines are in a horizontal orientation), the cross-perspective alignment system 106 similarly generates alignment bin maps for perspectives that are oriented vertically in various embodiments. Indeed, in such embodiments, the cross-perspective alignment system 106 adjusts the parameters as needed to divide each perspective into a plurality of alignment bins. For instance, in some cases, in a vertical orientation, the cross-perspective alignment system 106 determines a vertical reference line and determines alignment bins that are bounded by vertical lines that make an angle with the vertical reference line based on a tolerance angle.

As mentioned, in one or more embodiments, the cross-perspective alignment system 106 utilizes a tolerance angle to generate an alignment bin map for a perspective. Further, in some cases, the cross-perspective alignment system 106 determines the tolerance angle using a tolerance distance. In some embodiments, the cross-perspective alignment system 106 utilizes a tolerance angle (rather than a tolerance distance) in generating an alignment bin map for a perspective to address the issue of diminishing tolerance. FIG. 4B illustrates the issue of diminishing tolerance addressed by the cross-perspective alignment system 106 in accordance with one or more embodiments.

As shown in FIG. 4B, the cross-perspective alignment system 106 determines a tolerance distance 420. FIG. 4B shows the cross-perspective alignment system 106 determining a tolerance distance 420 of two units for purposes of illustration. It should be understood that the cross-perspective alignment system 106 determines tolerance distances of various lengths in various embodiments.

FIG. 4B further shows horizontal reference line 422 and a first horizontal line 426, both of which extend to a vanishing point 424. As shown, at a vertical reference line 428, the horizontal reference line 422 and the first horizontal line 426 are at a vertical distance (labeled D1) that is equal to the tolerance distance 420. At a point much closer to the vanishing point 424, however, the horizontal reference line 422 and the first horizontal line 426 are at a vertical distance (labeled D2) that is equal to half the tolerance distance 420. Indeed, in accordance with the perspective 430, the horizontal reference line 422 and the first horizontal line 426 move closer to one another as they extend toward the vanishing point 424. Thus, the vertical distance between the horizontal reference line 422 and the first horizontal line 426 diminishes in the direction toward the vanishing point 424.

As will be explained below, in one or more embodiments, the cross-perspective alignment system 106 utilizes a tolerance angle (and the alignment bins determined using the tolerance angle) in determining a modified alignment for an object in one perspective so that it aligns with another object in a different perspective. In some cases, because the distance between perspective lines diminishes towards the vanishing point, using a tolerance distance to determine a modified alignment for an object risks performance issues. For instance, when an object is near the vanishing point of its perspective, multiple alignment bins may fall within the tolerance distance. Accordingly, multiple alignment positions may become available, and the results can be inconsistent. In some instances, however, by utilizing a tolerance angle, the cross-perspective alignment system 106 ensures that the angle considered when determining a modified alignment for an object is consistent regardless of the distance to the vanishing point.

FIG. 4C illustrates the cross-perspective alignment system 106 sorting snappable line segments extracted from objects portrayed in a perspective using an alignment bin map generated for that perspective in accordance with one or more embodiments. Indeed, FIG. 4C illustrates a first perspective 440a and a second perspective 440b. Further, FIG. 4C illustrates a first alignment bin map 442 generated for the first perspective 440a. As shown, the cross-perspective alignment system 106 utilizes the first alignment bin map 442 to map line segments (represented by the line segment column 444) to indices (represented by the index column 446). In one or more embodiments, the indices correspond to the alignment bins used to divide the first perspective 440a. In particular, a given alignment bin corresponds to one or more indices within the first alignment bin map 442.

FIG. 4C further illustrates a first object 448 and a second object 450 portrayed within the first perspective 440a. Further, FIG. 4C shows that the first object 448 and the second object 450 are positioned so that they partially reside in a first alignment bin 452 and a second alignment bin 454 determined for the first perspective 440a. FIG. 4C shows two alignment bins for simplification, but it should be understood that the cross-perspective alignment system 106 determines additional alignment bins (both above and below the horizontal reference line 456) in various embodiments.

In particular, as shown, a snappable line segment 458 associated with the first object 448 is positioned within the second alignment bin 454. Accordingly, in one or more embodiments, the cross-perspective alignment system 106 associates the snappable line segment 458 with an index that corresponds to the second alignment bin 454 within the first alignment bin map 442. Similarly, as shown, a snappable line segment 460 associated with the second object 450 is positioned in the second alignment bin 454. Thus, the cross-perspective alignment system 106 associates the snappable line segment 460 with an index that corresponds to the second alignment bin 454 within the first alignment bin map 442.

In some embodiments, the cross-perspective alignment system 106 associates the snappable line segment 458 and the snappable line segment 460 with the same index within the first alignment bin map 442. In some cases, the cross-perspective alignment system 106 associates the snappable line segment 458 and the snappable line segment 460 with different (e.g., but adjacent) indices. In some cases, the cross-perspective alignment system 106 associates a single index with the second alignment bin 454 and creates sub-indices for the snappable line segment 458 and the snappable line segment 460.

In one or more embodiments, as both the snappable line segment 458 and the snappable line segment 460 are positioned within the second alignment bin 454, the cross-perspective alignment system 106 further sorts the snappable line segment 458 and the snappable line segment 460 based on their respective distance from the vanishing point 462 associated with the first perspective 440a. For instance, in some cases, upon determining that the snappable line segment 460 is closer to the vanishing point 462 than the snappable line segment 458, the cross-perspective alignment system 106 associates the snappable line segment 460 with a higher index value than the snappable line segment 458. In some cases, the cross-perspective alignment system 106 associates snappable line segments that are relatively closer with lower index values. In one or more embodiments, the cross-perspective alignment system 106 determines the distance of a snappable line segment from a corresponding vanishing point by determining the distance between the vanishing point and the end point of the snappable line segment closest to the vanishing point.

In one or more embodiments, the cross-perspective alignment system 106 sorts all snappable line segments extract from the first object 448 and the second object 450 as described above. Thus, in one or more embodiments, the cross-perspective alignment system 106 sorts snappable line segments associated with a perspective based on the alignment bin within which the snappable line segments are positioned. The cross-perspective alignment system 106 further sorts snappable line segments positioned within the same alignment bin based on their distance to the vanishing point associated with that perspective.

In some cases, the cross-perspective alignment system 106 more particularly sorts snappable line segments associated with a perspective based on their angle with respect to a horizontal reference line. For instance, in some embodiments, the cross-perspective alignment system 106 associates snappable line segments making relative greater angles with relatively higher index values. As will be shown with algorithm 1 below, however, the cross-perspective alignment system 106 utilizes the angle of a snappable line segment to determine an integer value that is associated with an alignment bin in some implementations. Either way, in some cases, the cross-perspective alignment system 106 utilizes the same approach for sorting snappable line segments associated with the first perspective 440a within the first alignment bin map 442 and sorting snappable line segments associated with the second perspective 440b within a corresponding alignment bin map.

Indeed, as previously mentioned, the cross-perspective alignment system 106 adds snappable line segments associated with a perspective to a snappable line segment set for that perspective. Accordingly, in one or more embodiments, the cross-perspective alignment system 106 iterates through the snappable line segment set for a perspective to sort the snappable line segments included therein using the corresponding alignment bin map.

The algorithm presented below represents a characterization of how the cross-perspective alignment system 106 sorts snappable line segments associated with a perspective utilizing an alignment bin map for that perspective in accordance with some embodiments.

---

Algorithm 1: Creation of Perspective Alignment Bin

---

Require: tolerance angle A, list of snappable segments of perspective bounding boxes in S
procedure KEY(Angle)

$$key \leftarrow \frac{Angle}{A}$$

| Algorithm 1: Creation of Perspective Alignment Bin |
| --- |
| return integer part of key   ▷ Bin number based on tolerance angle<br>procedure INSERTION(l, B)<br>  m ← angle of l with respect to central line passing through the<br>  vanishing point<br>  Q ← KEY(m)<br>  Add l in B[Q]<br>B is Alignment Bin Map with value being list of location whose angle lies in that bin.<br>for each $l_i$ in S do<br>  INSERTION($l_i$, B)<br>for each angle Q in B do<br>  S ← B[Q]   ▷ B[Q] may be denoted as $B_Q$<br>  sort S based on angle of line segment from the vanishing point.<br>  In case there are line segments with equal angle, sort S on basis of distance from vanishing point |

As indicated by algorithm 1, in some cases, the cross-perspective alignment system 106 utilizes a first procedure to determine an integer value for a snappable line segment by dividing the angle of the snappable line segment by the tolerance angle A. In some cases, the cross-perspective alignment system 106 rounds up, rounds down, or rounds to the nearest integer to determine the integer value returned via the first procedure. The cross-perspective alignment system 106 further utilizes a second procedure in which the cross-perspective alignment system 106 inserts the snappable line segment into the alignment bin map B. Thus, the cross-perspective alignment system 106 sorts the snappable line segments within a set S based on their angles. As further indicated in the last line of algorithm 1, the cross-perspective alignment system 106 further sorts snappable line segments having the same angle based on their distance from the vanishing point.

As further indicated by algorithm 1, in one or more embodiments, the cross-perspective alignment system 106 associates each alignment bin of an alignment bin map with an integer value. For instance, in some cases, the cross-perspective alignment system 106 associates the first alignment bin that is bordered by the horizontal reference line with a value of one, associates the second alignment bin that is adjacent to the first alignment bin with a value of two, and so forth. In some cases, the integer value associated with an alignment bin corresponds to the tolerance angle multiple associated with that alignment bin. For example, in some instances, the first alignment bin that is bordered by the horizontal reference line covers horizontal lines making an angle with the horizontal reference line up to a multiple of one of the tolerance angle. Likewise, the second alignment bin that is adjacent to the first alignment bin covers horizontal lines making an angle with the horizontal reference line up to a multiple of two of the tolerance angle. Thus, in some cases, the cross-perspective alignment system 106 associates each alignment bin with a number that represents the angles that are included.

As previously indicated, in some instances, the cross-perspective alignment system 106 determines alignment bins positioned both above and below the horizontal reference line. Accordingly, in some cases, the cross-perspective alignment system 106 determines two alignment bins that are bordered by the horizontal reference line (e.g., one above and one below). In some cases, the cross-perspective alignment system 106 associates both alignment bins with a value of one and separates snappable line segments based on whether they appear above or below the horizontal reference line. In some instances, the cross-perspective alignment system 106 associates alignment bins above the horizontal reference line with a positive integer value and alignment bins below the horizontal reference line with a negative integer value.

In one or more embodiments, the cross-perspective alignment system 106 performs the sorting of the snappable line segments before an object is selected for movement within a perspective or insertion into a perspective (e.g., before a modified alignment for the object is to be determined). Indeed, in some cases, sorting the snappable line segments when an object is to be moved or inserted adds to the time complexity of determining a modified alignment for the object. Thus, by pre-sorting, the cross-perspective alignment system 106 reduces to perform the process for determining the modified alignment. In some implementations, whenever an object is moved or added, the cross-perspective alignment system 106 updates the sorting based on the movement or addition.

Figure 5A:
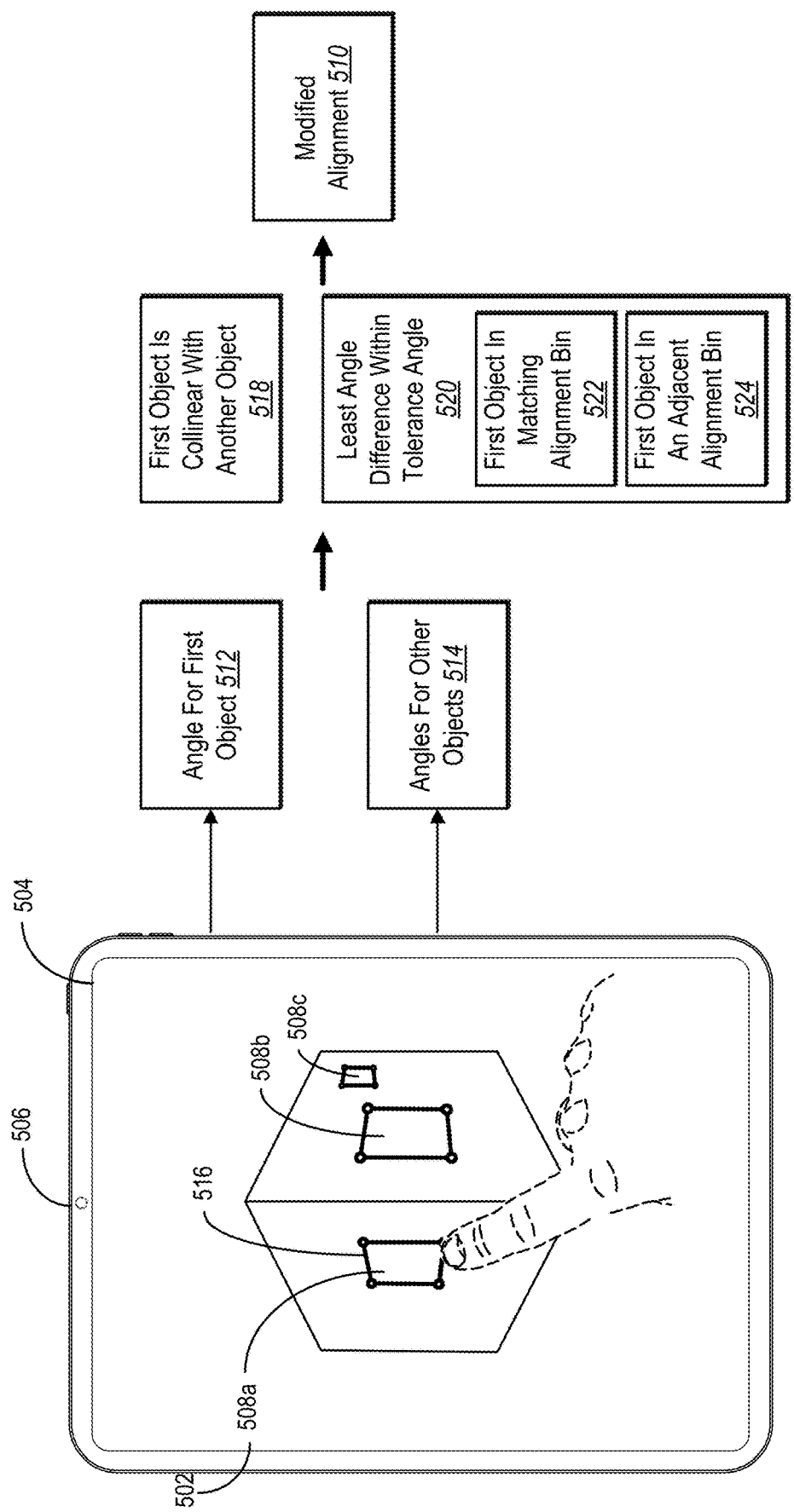
FIG. 5A illustrates the cross-perspective alignment system determining a modified alignment for an object portrayed within a digital image in accordance with one or more embodiments.

As previously mentioned, in one or more embodiments, the cross-perspective alignment system 106 determines a modified alignment for an object moved within or added to a digital image. In particular, the cross-perspective alignment system 106 determines a modified alignment for an object portrayed within one perspective to align the object with another object portrayed within another perspective. FIG. 5A illustrates the cross-perspective alignment system 106 determining a modified alignment for an object portrayed within a digital image in accordance with one or more embodiments.

As shown in FIG. 5A, the cross-perspective alignment system 106 provides a digital image 502 for display within a graphical user interface 504 of a client device 506. The digital image 502 portrays a first object 508a within a first perspective. The digital image 502 also portrays a second object 508b and a third object 508c within a second perspective. Additionally, as shown in FIG. 5A, the cross-perspective alignment system 106 detects the first object 508a being moved within (or added to) the first perspective. For instance, in some cases, the cross-perspective alignment system 106 detects one or more user interactions with the client device 506 (e.g., via the graphical user interface 504) for moving (or adding) the first object 508a. As illustrated by FIG. 5A, in response to determining that the first object 508a is being moved within (or added to) the first perspective, the cross-perspective alignment system 106 determines a modified alignment 510 for the first object 508a.

In one or more embodiments, determining the modified alignment 510 for the first object 508a involves determining a position for the first object 508a within the first perspective that aligns the first object 508a with an object from the second perspective (e.g., the second object 508b or the third object 508c). In some cases, determining the position for alignment includes identifying or selecting an object from the second perspective to use in determining the modified alignment for the first object 508a. In some embodiments, as will be explained, the cross-perspective alignment system 106 maps the alignment of the selected object in the second perspective to the first perspective for positioning the first object 508a.

In one or more embodiments, the cross-perspective alignment system 106 selects an object from the second perspective to use in determining the modified alignment 510 for the first object 508a based on a measure of collinearity between the first object 508a and the other object. Indeed, in some embodiments, the cross-perspective alignment system 106 determines a measure of collinearity between the first object 508a and another object from the second perspective and determines whether to use the other object based on the measure of collinearity.

In one or more embodiments, a measure of collinearity includes an angular difference. In particular, in some embodiments, a measure of collinearity includes a difference in angles associated with objects, the difference indicating the collinearity of those objects. In one or more embodiments, the cross-perspective alignment system 106 determines a measure of collinearity between the first object 508a and another object by determining a measure of collinearity between a segment of the first object 508a and a segment of the other object. For instance, in some cases, the cross-perspective alignment system 106 determines a measure of collinearity between a snappable line segment of the first object 508a and a snappable line segment of the other object.

To illustrate, as shown in FIG. 5A, the cross-perspective alignment system 106 determines an angle 512 for the first object 508a and angles 514 for the other objects (e.g., an angle for the second object 508b and an angle for the third object 508c). For instance, in some embodiments, the cross-perspective alignment system 106 determines an angle for the snappable line segment 516 associated with the top portion of the perspective bounding box for the first object 508a. Similarly, in some cases, the cross-perspective alignment system 106 determines an angle for the snappable line segment associated with the top portion of the perspective bounding box for each of the second object 508b and the third object 508c (perspective bounding boxes for those objects not shown here). In one or more embodiments, the cross-perspective alignment system 106 determines the angle of a snappable line segment by determining the angle made by the snappable line segment with respect to a horizontal reference line for the corresponding perspective. Though FIG. 5A suggests that the cross-perspective alignment system 106 determines one particular angle for each object, the cross-perspective alignment system 106 determines multiple angles or alternative angles for each object in some implementations. For instance, in some cases, the cross-perspective alignment system 106 determines an angle for each object using the snappable line segment associated with the bottom portion of the corresponding perspective bounding box.

In some cases, the cross-perspective alignment system 106 determines that the angle 512 for the first object 508a changes as the first object 508a is moved within the first perspective. Indeed, the cross-perspective alignment system 106 determines that the perspective bounding box of the first object 508a changes in accordance with the first perspective as the first object 508a is moved (e.g., so that the horizontal lines point towards an associated vanishing point). Accordingly, in some embodiments, the cross-perspective alignment system 106 determines the angle 512 of the first object 508a based on its movement within the first perspective. In some cases, the cross-perspective alignment system 106 tracks and updates the angle 512 based on the movement.

In some embodiments, the cross-perspective alignment system 106 determines the angles 514 for the other objects based on their positioning within the second perspective. Indeed, in some cases, while moving the first object 508a based on user input, the cross-perspective alignment system 106 maintains the positions of the second object 508b and the third object 508c within the second perspective. Accordingly, in some cases, the cross-perspective alignment system 106 determines that the angles 514 for the second object 508b and the third object 508c are static, at least during the movement of the first object 508a.

To provide more detail regarding using a measurer of collinearity, FIG. 5A illustrates the cross-perspective alignment system 106 determining the modified alignment 510 for the first object 508a based on determining that the first object 508a is collinear with another object of the second perspective (box 518). In particular, in some embodiments, the cross-perspective alignment system 106 searches for another object in the second perspective that is collinear with the first object 508a.

To illustrate, in some embodiments, the cross-perspective alignment system 106 determines whether the angle 512 for the first object 508a is collinear with the angle for the second object 508b or the third object 508c in accordance with their respective perspectives. In particular, in some embodiments, the cross-perspective alignment system 106 determines whether the angle 512 for the first object 508a in the first perspective equals the angle for one of the second object 508b or the third object 508c in the second perspective. In some cases, upon determining that the angle 512 for the first object 508a is equal to the angle for another object in the second perspective, the cross-perspective alignment system 106 selects that object for alignment with the first object 508a. Accordingly, the cross-perspective alignment system 106 determines the modified alignment 510 for the first object 508a by mapping the alignment of selected object from the second perspective to the first perspective.

In some cases, where multiple collinear objects are identified, the cross-perspective alignment system 106 selects the object having the snappable line segment that is the closets in distance to the first object 508a (e.g., the snappable line segment of the first object 508a) for aligning the first object 508a.

As shown in FIG. 5A, the cross-perspective alignment system 106 alternatively determines the modified alignment 510 for the first object 508a based on a least angle difference between the first object 508a and another object in the second perspective that is within the range of the tolerance angle (box 520). For instance, in some implementations, upon determining that the first object 508a is not collinear with another object of the second perspective, the cross-perspective alignment system 106 searches for an object in the second perspective to select for alignment with the first object 508a via this alternative option. To illustrate, in some cases, the cross-perspective alignment system 106 searches for another object in the second perspective that is within the range of the tolerance angle from the first object 508a. In other words, the cross-perspective alignment system 106 searches for another object having a difference in angle from the first object 508a that is within the threshold set forth by the tolerance angle. In some instances, where multiple such objects are identified, the cross-perspective alignment system 106 determines which object has the smallest angle difference with the first object 508a.

For example, as shown in FIG. 5A, the cross-perspective alignment system 106 determines whether the first object 508a is in an alignment bin that matches with another object in the second perspective (box 522). In particular, the cross-perspective alignment system 106 determines whether the first object 508a is in an alignment bin having a matching index as another object in the second perspective (box 522). To illustrate, in some cases, the cross-perspective alignment system 106 determines whether the first object 508a is associated with an index for the alignment bin map generated for the first perspective that matches (e.g., has the same value) as the index associated with another object within the alignment bin map generated for the second perspective. In some embodiments, upon determining that multiple such objects are available, the cross-perspective alignment system 106 selects the object having the least angle difference with the first object 508a. Accordingly, the cross-perspective alignment system 106 determines the modified alignment 510 for the first object 508a by mapping the alignment of selected object from the second perspective to the first perspective.

As further shown in FIG. 5A, the cross-perspective alignment system 106 determines whether the first object 508a is in an alignment bin that corresponds to an adjacent alignment bin for an object in the second perspective (box 524). In particular, the cross-perspective alignment system 106 determines whether the first object is associated with an index within the alignment bin map for the first perspective that corresponds to an index within the alignment bin map for the second perspective that is adjacent to (e.g., immediately prior to or immediately following) the index of another object in the second perspective. The cross-perspective alignment system 106 further determines whether such an object is within the tolerance angle of the first object 508a. In some embodiments, if multiple such objects are available, the cross-perspective alignment system 106 selects the object having the least angle difference with the first object. Accordingly, the cross-perspective alignment system 106 determines the modified alignment 510 for the first object 508a by mapping the alignment of selected object from the second perspective to the first perspective.

To provide an illustration of the above, in one or more embodiments, the cross-perspective alignment system 106 searches for an object in the second perspective having an angle that is equal to the angle of the first object 508a (e.g., the current angle at a given point in time). If no such object is found, the cross-perspective alignment system 106 searches for an object in the second perspective having an angle that is within the tolerance angle of the first object 508a. In some cases, the cross-perspective alignment system 106 searches for such an object by searching for an object within the second perspective having a matching index. In some instances, the cross-perspective alignment system 106 searches for such an object by searching for an object within the second perspective that has an adjacent index and is still within the tolerance angle. In some cases, where multiple such objects are found (in a matching and/or adjacent index), the cross-perspective alignment system 106 determines which object has the least angle difference with the first object 508a. In one or more embodiments, the cross-perspective alignment system 106 determines the modified alignment for the first object 508a by mapping the alignment of the selected object from the second perspective to the first perspective.

The algorithm presented below represents a characterization of how the cross-perspective alignment system 106 determines a modified alignment for an object in one perspective to align the object with another object portrayed in another perspective in accordance with some embodiments.

---

Algorithm 2: Finding Snapping Location

---

Require: Input subject, which is transformed in S1, Alignment Bin Maps M1 and M2, tolerance angle A procedure WINNINGCANDIDATE(S2, M2)

for each line segment l representing each side of the perspective bounding box of S1: do ang = Angle of line segment with central line passing through vanishing point bin = Alignment Bin in which l lies in M1 if the M2[bin] consists of lines with the same angle as that of l then

The line with the minimum distance between the ends which is farther away from the vanishing point is chosen as the winning candidate else use linear search to find a line segment which makes the least angle with line 1 within the tolerance Angle A.

If this is found, it will be considered as a winning candidate.

If not, consider the lines in one of the adjacent bin in M2 I.e., just previous and just next alignment bin of M2[bin] and find the line which makes the least angle difference within the tolerance angle A.

---

In one or more embodiments, the cross-perspective alignment system 106 prioritizes objects in the second perspective that are associated with a matching index over objects that are associated with an adjacent index. Accordingly, in some cases, the cross-perspective alignment system 106 searches for objects in the second perspective associated with a matching index and then searches for objects associated with an adjacent index upon determining that there are no objects in the second perspective with a matching index. In some implementations, however, the cross-perspective alignment system 106 identifies objects having a matching index and objects associated with an adjacent index and selects the object having the least angle difference with the first object 508a.

In algorithm 2, S1 and S2 represent the set of snappable line segments associated with the first perspective and second perspective, respectively. As indicated by algorithm 2, the cross-perspective alignment system 106 utilizes the options illustrated in FIG. 5A for identifying an object in the second perspective to use in determining the modified alignment for an object in the first perspective.

The algorithm presented below represents another characterization of how the cross-perspective alignment system 106 determines a modified alignment for an object in one perspective to align the object with another object portrayed in another perspective in accordance with some embodiments. Specific values are given below for illustration purposes.

Algorithm 3: Find Snapping Location

M1 = Alignment Bin Map for Perspective1
M2 = Alignment Bin Map for Perspective2
for moving segment s1 in P1:
  Find A = angle it makes with central line (e.g., 34 degrees)
  Index1 = Map index of Bin in M1 where this angle lies in M1 (e.g., 30-35 degrees)
  T1 = Ratio of position of s1 in M1[Index1]: that is find the relative position of segment in the alignment bin of M1 (which is [(34-30)/5] = 0.8)
  Find Bin 2= M2[Index1] i.e., use index1 to find the alignment bin in M2 (e.g., 60-70 degrees)
    Find the Segment s2 nearest to the T1 value in M2[Index1]: that is find the nearest segment within tolerance in M2[Index1] to the relative position T2 in that bin of M2 (e.g., at 66 degrees)
    Tnew = Now find the exact ratio of relative position of s2 in M2[Index1] alignment bin (which is ((66-60)/10) = 0.6)
      Anew = Find the corresponding angle at Tnew in M1[Index1]
      (which is ((35-30)*0.6) = 33degrees)
      Now snap the s1 to 33 degrees in perspective 1 and show guiding hint The exemplary values shown in algorithm 3 suggest an embodiment in which the tolerance angle differs between the first and second perspectives. As indicated by Algorithm 3, the cross-perspective alignment system 106 determines an index value a snappable line segment for a first object being moved within a first perspective and further determines a relative position of the snappable line segment within its alignment bin. The cross-perspective alignment system 106 identifies a corresponding alignment bin for the alignment bin map of the second perspective and searches for a snappable line segment for a second object within the second perspective having a relative position that is close to the relative position of the first object. The cross-perspective alignment system 106 further utilizes the relative position of the second object to determine the modified alignment for the first object.

In one or more embodiments, the cross-perspective alignment system 106 caches the locations of the objects within their perspectives to facilitate quick retrieval when an object is moved within (or added to) its perspective. For instance, as discussed above, the cross-perspective alignment system 106 tracks the position of an object being moved within a perspective in some embodiments. In some cases, the cross-perspective alignment system 106 caches the up-to date position. Further, in some instances, the cross-perspective alignment system 106 caches the positions of the other objects in the other perspective. Thus, rather than determining the positioning of each object every time an object is to be moved within (or added to) a perspective to determine a modified alignment for that object, the cross-perspective alignment system 106 leverages the cached information to complete the process more quickly.

Figure 5B:
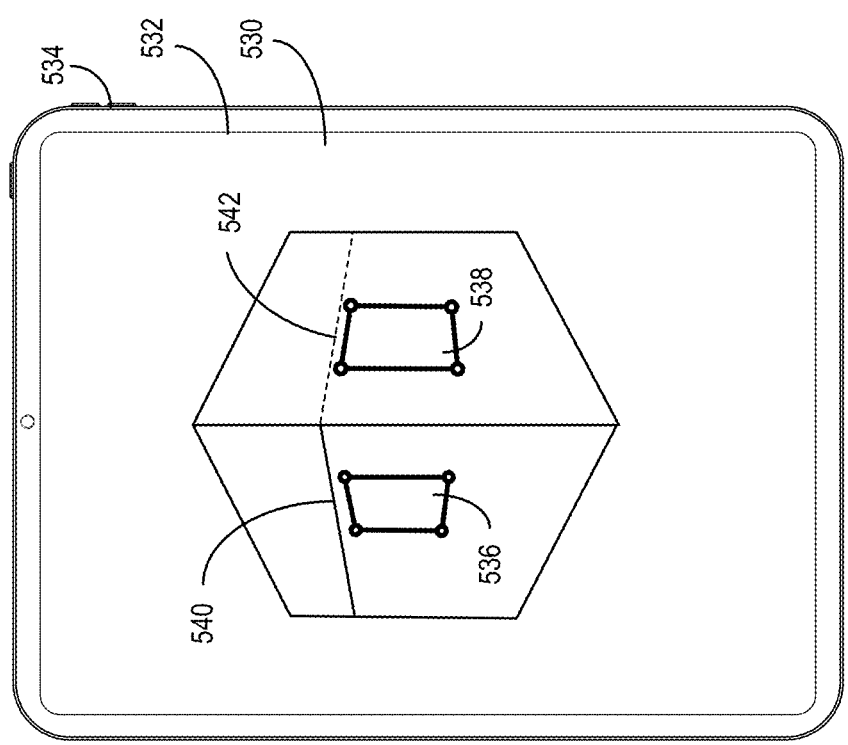
FIG. 5B illustrates, the cross-perspective alignment system positioning an object within a digital image in accordance with a modified alignment determined for the object in accordance with one or more embodiments.

As previously suggested, and as indicated by the last line of algorithm 3, the cross-perspective alignment system 106 modifies the digital image by positioning an object being moved within (or added to) a perspective based on a modified alignment determined for that object in some embodiments. FIG. 5B illustrates, the cross-perspective alignment system 106 positioning an object within a digital image in accordance with a modified alignment determined for the object in accordance with one or more embodiments.

Indeed, as shown in FIG. 5B, the cross-perspective alignment system 106 provides a digital image 530 for display within a graphical user interface 532 of a client device 534. FIG. 5B shows that the digital image portrays a first object 536 within a first perspective and a second object 538 within a second perspective. In one or more embodiments, the first object 536 includes an object that has been moved within (or added to) the first perspective.

As shown in FIG. 5B, the cross-perspective alignment system 106 positions the first object 536 within the first perspective. In particular, the cross-perspective alignment system 106 positions the first object 536 in accordance with a modified alignment indicated by the line 540. As indicated by the line 540 and the line 542, the cross-perspective alignment system 106 maps an alignment of the second object 538 from the second perspective onto the first perspective in determining the modified alignment for the first object 536. For instance, in some embodiments, the cross-perspective alignment system 106 determines a perspective line of the second perspective (e.g., represented by the line 542) that corresponds to a positioning of the second object 538. The cross-perspective alignment system 106 further determines a corresponding perspective line in the first perspective (e.g., represented by the line 540). In other words, the cross-perspective alignment system 106 maps the perspective line associated with the second object 538 in the second perspective to the first perspective.

As further shown in FIG. 5B, the cross-perspective alignment system 106 generates and provides a perspective guide (e.g., a visual element associated with the line 540 and the line 542) for display to indicate the positioning of the first object 536 in the first perspective. Indeed, as shown, the cross-perspective alignment system 106 generates and provides the perspective guide to provide a visualization of the modified alignment determined for the first object 536.

In one or more embodiments, the cross-perspective alignment system 106 positions the first object 536 in response to user input. For instance, in some cases, the cross-perspective alignment system 106 generates and provides the perspective guide as a recommendation, receives user input for moving the first object 536 to the positioning indicated by the perspective guide, and moves the first object 536 accordingly. In some implementations, however, the cross-perspective alignment system 106 automatically positions the first object 536 in accordance with the modified alignment (e.g., by snapping the first object 536 to the positioning). In some cases, the cross-perspective alignment system 106 automatically positions the first object 536 and provides the perspective guide to indicate the positioning.

In one or more embodiments, the cross-perspective alignment system 106 further adjusts the size of the first object 536 based on its horizontal distance to the vanishing point associated with the first perspective. For instance, in some cases, upon moving the first object 536 horizontally closer to the vanishing point, the cross-perspective alignment system 106 diminishes the size of the first object 536. In some instances, upon moving the first object 536 horizontally farther away from the vanishing point, the cross-perspective alignment system 106 increases the size of the first object 536. In some implementations, the cross-perspective alignment system 106 diminishes or increases the size of the first object 536 in proportion to the distance moved toward or away from the vanishing point, respectively.

Thus, the cross-perspective alignment system 106 operates more flexibly when compared to conventional systems. In particular, the cross-perspective alignment system 106 flexibly offers features for aligning objects across different perspectives of a digital image. Indeed, by mapping the alignment of an object from another perspective onto the perspective of an object to be aligned, the cross-perspective alignment system 106 offers flexible alignment of that object based on the other object. Further, the alignment approach offered by the cross-perspective alignment system 106 is free of the restrictions of grids and free of the errors of user input, allowing for more accurate alignment of objects that lead to a more natural, consistent appearance.

Further, by determining a modified alignment for an object as described above, the cross-perspective alignment system 106 operates more efficiently than conventional systems. Indeed, the cross-perspective alignment system 106 implements a set of alignment bins that is smaller than the grids used by many conventional systems. Accordingly, the cross-perspective alignment system 106 searches its set of alignment bins to determine a position for aligning an object much more quickly than possible under conventional systems.

Figure 6:
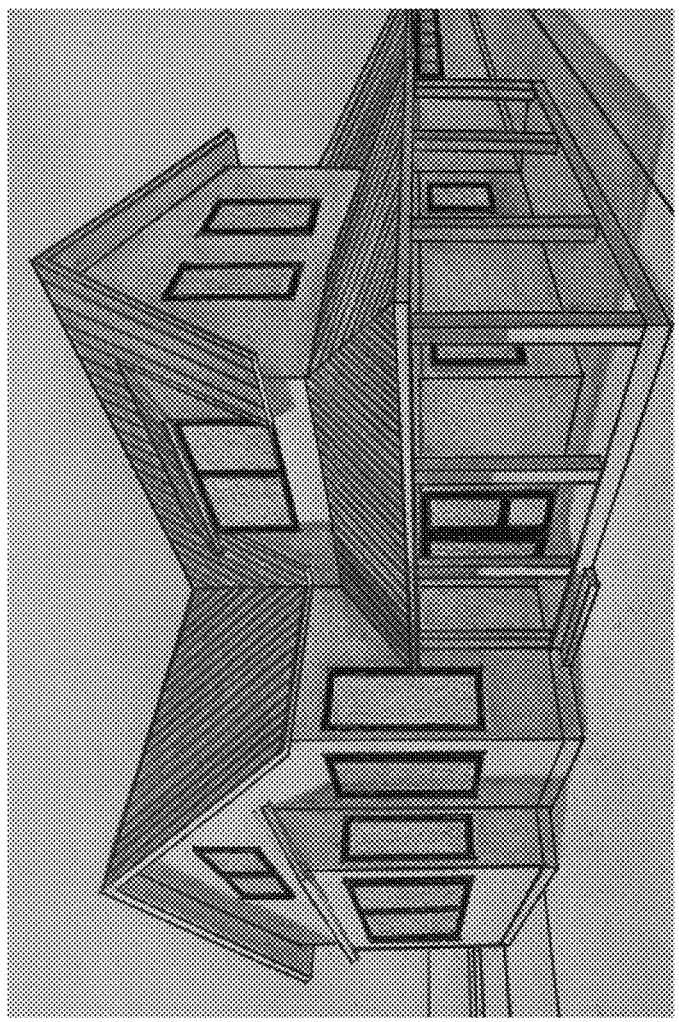
FIG. 6 illustrates a multi-perspective digital image operated on by the cross-perspective alignment system in accordance with some embodiments.

In one or more embodiments, the cross-perspective alignment system 106 modifies a digital image that portrays more than two perspectives to position an object within one of the perspectives in accordance with a modified alignment determined for that perspective. FIG. 6 illustrates a digital image that portrays more than two perspectives in accordance with some embodiments. In particular, the digital image of FIG. 6 illustrates a home having multiple faces that create a plurality of different perspectives in different perspective planes.

In one or more embodiments, the cross-perspective alignment system 106 modifies a digital image, such as the one shown in FIG. 6, by operating on pairs of perspectives. For instance, when moving an object within a first perspective, the cross-perspective alignment system 106 identifies a corresponding second perspective. The cross-perspective alignment system 106 further identifies an object in the corresponding second perspective and utilizes the positioning of the second object to determine a modified alignment for the object within the first perspective. Thus, in some implementations, where a digital image includes three or more perspectives, the cross-perspective alignment system 106 aligns objects across perspective pairs.

Figure 7:
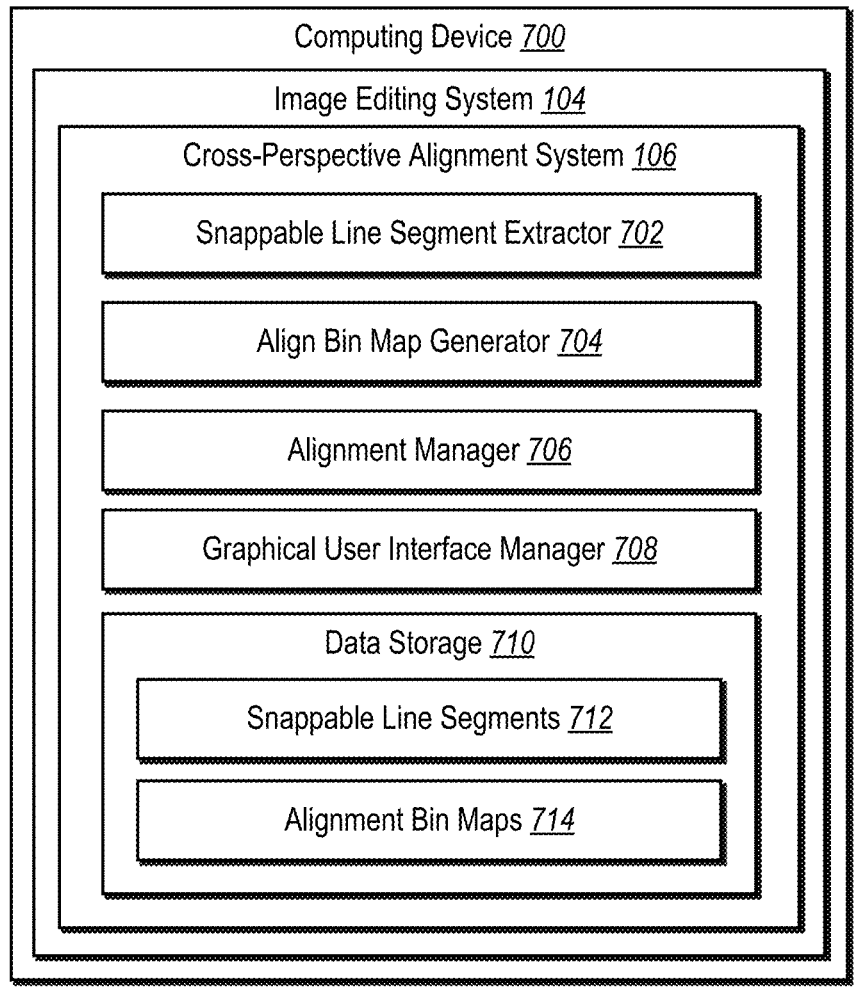
FIG. 7 illustrates an example schematic diagram of a cross-perspective alignment system in accordance with one or more embodiments.

Turning now to FIG. 7, additional detail will now be provided regarding various components and capabilities of the cross-perspective alignment system 106. In particular, FIG. 7 illustrates the cross-perspective alignment system 106 implemented by the computing device 700 (e.g., the server(s) 102 and/or one of the client devices 110a-110n discussed above with reference to FIG. 1). Additionally, the cross-perspective alignment system 106 is part of the image editing system 104. As shown in FIG. 7, the cross-perspective alignment system 106 includes, but is not limited to, a snappable line segment extractor 702, an alignment bin map generator 704, an alignment manager 706, a graphical user interface manager 708, and data storage 710 (which includes snappable line segments 712 and alignment bin maps 714).

As just mentioned, and as illustrated in FIG. 7, the cross-perspective alignment system 106 includes the snappable line segment extractor 702. In one or more embodiments, the snappable line segment extractor 702 extracts snappable line segments from objects portrayed in a digital image. In particular, in some embodiments, the snappable line segment extractor 702 extracts snappable line segments from the perspective bounding boxes of objects portrayed in a digital image. For instance, in some cases, the snappable line segment extractor 702 extracts each segment of a perspective bounding box as a snappable line segment.

Additionally, as shown in FIG. 7, the cross-perspective alignment system 106 includes the alignment bin map generator 704. In one or more embodiments, the alignment bin map generator 704 generates alignment bin maps for the perspectives portrayed by a digital image. In particular, in some cases, the alignment bin map generator 704 generates an alignment bin map for each perspective. In some implementations, the cross-perspective alignment system 106 generates an alignment bin map for a perspective by dividing the perspective (e.g., the portion of the digital image portrayed in the perspective) into a plurality of alignment bins.

Further, as shown in FIG. 7, the cross-perspective alignment system 106 includes the alignment manager 706. In one or more embodiments, the alignment manager 706 determines a modified alignment for an object moved within (or added to) a perspective portrayed within a digital image so that the object is aligned with another object portrayed in another perspective. For instance, in some cases, the alignment manager 706 searches for another object portrayed in the other perspective to use for the alignment. The alignment manager 706 further determines the modified alignment based on the positioning of the other object in its perspective.

As shown in FIG. 7, the cross-perspective alignment system 106 also includes the graphical user interface manager 708. In one or more embodiments, the graphical user interface manager 708 manages the graphical user interface of a client device that is displaying a digital image. In some cases, the graphical user interface manager 708 provides visual elements for display based on the digital image and/or edits made to the digital image. For instance, in some embodiments, the graphical user interface manager 708 generates and provides a perspective guide that indicates a positioning for an object in accordance with a modified alignment determined for the object.

As shown in FIG. 7, the cross-perspective alignment system 106 also includes data storage 710. In particular, data storage 710 (implemented by one or more memory devices) includes snappable line segments 712 and alignment bin maps 714. In one or more embodiments, the snappable line segments 712 store the snappable line segments extracted from objects portrayed in a digital image. In some embodiments, the alignment bin maps 714 store the alignment bin maps generated for the perspectives portrayed within a digital image. In some cases, the alignment bin maps 714 also stores the indices of snappable line segments within the alignment bin maps.

Each of the components 702-714 of the cross-perspective alignment system 106 can include software, hardware, or both. For example, the components 702-714 can include one or more instructions stored on a computer-readable storage medium and executable by processors of one or more computing devices, such as a client device or server device.

When executed by the one or more processors, the computer-executable instructions of the cross-perspective alignment system 106 can cause the computing device(s) to perform the methods described herein. Alternatively, the components 702-714 can include hardware, such as a special-purpose processing device to perform a certain function or group of functions. Alternatively, the components 702-714 of the cross-perspective alignment system 106 can include a combination of computer-executable instructions and hardware.

Furthermore, the components 702-714 of the cross-perspective alignment system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-714 of the cross-perspective alignment system 106 may be implemented as a stand-alone application, such as a desktop or mobile application. Furthermore, the components 702-714 of the cross-perspective alignment system 106 may be implemented as one or more web-based applications hosted on a remote server. Alternatively, or additionally, the components 702-714 of the cross-perspective alignment system 106 may be implemented in a suite of mobile device applications or "apps." For example, in one or more embodiments, the cross-perspective alignment system 106 can comprise or operate in connection with digital software applications such as ADOBE® PHOTOSHOP® or ADOBE® LIGHTROOM®. The foregoing are either registered trademarks or trademarks of Adobe Inc. in the United States and/or other countries.

Figure 8:
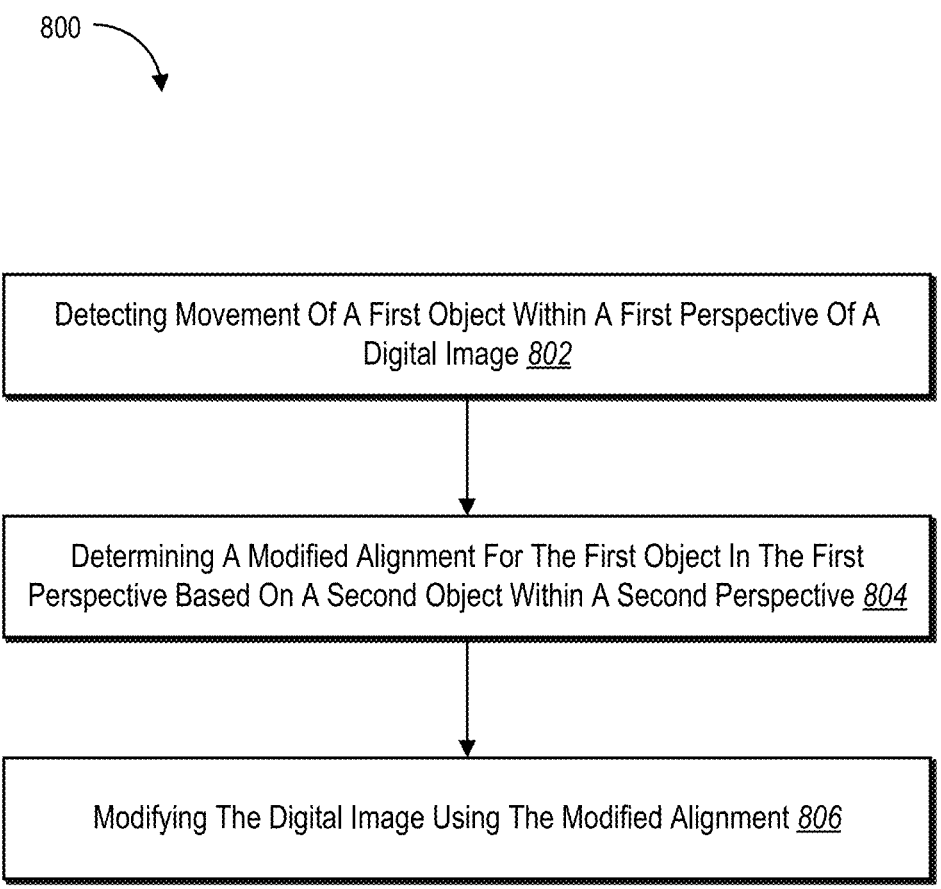
FIG. 8 illustrates a flowchart of a series of acts for aligning objects across different perspectives portrayed in a digital image in accordance with one or more embodiments.

FIGS. 1-7, the corresponding text, and the examples provide a number of different methods, systems, devices, and non-transitory computer-readable media of the cross-perspective alignment system 106. In addition to the foregoing, one or more embodiments can also be described in terms of flowcharts comprising acts for accomplishing the particular result, as shown in FIG. 8. FIG. 8 may be performed with more or fewer acts. Further, the acts may be performed in different orders. Additionally, the acts described herein may be repeated or performed in parallel with one another or in parallel with different instances of the same or similar acts.

FIG. 8 illustrates a flowchart of a series of acts 800 for aligning objects across different perspectives portrayed in a digital image in accordance with one or more embodiments. FIG. 8 illustrates acts according to one embodiment, alternative embodiments may omit, add to, reorder, and/or modify any of the acts shown in FIG. 8. In some implementations, the acts of FIG. 8 are performed as part of a method. Alternatively, a non-transitory computer-readable medium can store executable instructions thereon that, when executed by a processing device, cause the processing device to perform operations comprising the acts of FIG. 8. In some embodiments, a system performs the acts of FIG. 8. For example, in one or more embodiments, a system includes one or more memory components. The system further includes one or more processing devices coupled to the one or more memory components, the one or more processing devices to perform operations comprising the acts of FIG. 8.

The series of acts 800 includes an act 802 for detecting movement of a first object within a first perspective of a digital image. For example, in one or more embodiments, the act 802 involves detecting one or more user interactions for moving a first object within a first perspective of a digital image.

Additionally, the series of acts 800 includes an act 804 for determining a modified alignment for the first object in the first perspective based on a second object within a second perspective. For instance, in one or more embodiments, the act 804 involves determining a modified alignment of the first object within the first perspective by mapping an alignment of a second object portrayed within a second perspective of the digital image to the first perspective.

In one or more embodiments, the cross-perspective alignment system 106 generates a first alignment bin map for the first perspective and a second alignment bin map for the second perspective. Accordingly, in some embodiments, determining the modified alignment of the first object within the first perspective comprises determining the modified alignment of the first object within the first perspective utilizing the first alignment bin map and the second alignment bin map.

In some embodiments, generating the first alignment bin map for the first perspective comprises: determining a tolerance angle with respect to a horizontal reference line; and dividing the first perspective into a plurality of alignment bins using the tolerance angle. To illustrate, in some implementations, the cross-perspective alignment system 106 determines a tolerance distance; and determines a horizontal line that is positioned at a vertical distance from the horizontal reference line equal to the tolerance distance at a point where the first perspective meets the second perspective. Thus, in some instances, determining the tolerance angle comprises determining an angle between the horizontal line and the horizontal reference line.

In some embodiments, the cross-perspective alignment system 106 determines an index associated with the first object within the first alignment bin map based on movement of the first object within the first perspective; and determines an index associated with the second object within the second alignment bin map based on an angle of a snappable line segment of a perspective bounding box for the second object with respect to a horizontal reference line. Accordingly, in some instances, determining the modified alignment of the first object within the first perspective utilizing the first alignment bin map and the second alignment bin map comprises determining the modified alignment of the first object within the first perspective utilizing the index associated with the first object and the index associated with the second object.

In one or more embodiments, the cross-perspective alignment system 106 further determines a first measure of collinearity between a segment of the first object and a segment of the second object; determines a second measure of collinearity between the segment of the first object and a segment of a third object portrayed within the second perspective; and selects the second object for alignment with the first object upon based on comparing the first measure of collinearity and the second measure of collinearity.

The series of acts 800 further includes an act 806 for modifying the digital image using the modified alignment. For instance, in some cases, the act 806 involves modifying the digital image by positioning the first object within the first perspective in accordance with the modified alignment.

In one or more embodiments, positioning the first object within the first perspective in accordance with the modified alignment comprises snapping the first object to a location within the first perspective that aligns the first object with the second object in accordance with the modified alignment. In some cases, the cross-perspective alignment system 106 further generates, for display within a graphical user interface of a client device displaying the digital image, a perspective guide indicating a positioning of the first object within the first perspective in accordance with the modified alignment.

To provide an illustration, in one or more embodiments, the cross-perspective alignment system 106 detects one or more user interactions for moving a first object within a first perspective of a digital image; determines a modified alignment of the first object within the first perspective by mapping an alignment of a second object portrayed within a second perspective of the digital image to the first perspective; and modifies the digital image by positioning the first object within the first perspective in accordance with the modified alignment.

In one or more embodiments, the cross-perspective alignment system 106 further extracts one or more snappable line segments from a perspective bounding box for the first object, the one or more snappable line segments oriented in accordance with the first perspective. Thus, in some cases, determining the modified alignment of the first object within the first perspective comprises determining the modified alignment using at least one snappable line segment from the one or more snappable line segments.

In some instances, determining the modified alignment using the at least one snappable line segment from the one or more snappable line segments comprises: determining an angle of the at least one snappable line segment of the first object with respect to a horizontal reference line based on movement of the first object within the first perspective; and selecting the second object for alignment with the first object using the angle of the at least one snappable line segment of the first object. Further, in some embodiments, the cross-perspective alignment system 106 further extracts one or more additional snappable line segments from an additional perspective bounding box for the second object, the one or more additional snappable line segments oriented in accordance with the second perspective; determines an additional angle of at least one additional snappable line segment from the one or more additional snappable line segments with respect to the horizontal reference line; and selects the second object for alignment with the first object using the additional angle of the at least one additional snappable line segment. In some implementations, selecting the second object for alignment with the first object using the angle of the at least one snappable line segment of the first object and the additional angle of the at least one additional snappable line segment of the second object comprises selecting the second object for alignment with the first object upon determining that the angle of the at least one snappable line segment equals the additional angle of the at least one additional snappable line segment.

In one or more embodiments, the cross-perspective alignment system 106 further determines a horizontal reference line for the digital image; determines a tolerance angle with respect to the horizontal reference line; and generates, utilizing the tolerance angle, a first alignment bin map for the first perspective and a second alignment bin map for the second perspective. Thus, in some cases, determining the modified alignment of the first object within the first perspective comprises determining the modified alignment using the first alignment bin map and the second alignment bin map. In some instances, generating, utilizing the tolerance angle, the first alignment bin map for the first perspective and the second alignment bin map for the second perspective comprises, for each of the first perspective and the second perspective: determining a first alignment bin bounded by a first horizontal line and the horizontal reference line, wherein the first horizontal line is at an angle to the horizontal reference line that equals the tolerance angle; and determining a second alignment bin that is bounded by a second horizontal line and the first horizontal line, wherein the second horizontal line is at an angle to the horizontal reference line that equals double the tolerance angle.

To provide another illustration, in one or more embodiments, the cross-perspective alignment system 106 generates a first alignment bin map for a first perspective of a digital image and a second alignment bin map for a second perspective of the digital image; determines a first index associated with a first object portrayed within the first perspective of the digital image within the first alignment bin map based on movement of the first object within the first perspective; determines a modified alignment of the first object within the first perspective by mapping an alignment of a second object portrayed within the second perspective of the digital image to the first perspective using the first index associated with the first object within the first alignment bin map and a second index associated with the second object within the second alignment bin map; and modifies the digital image by positioning the first object within the first perspective in accordance with the modified alignment.

In some embodiments, determining the first index associated with the first object within the first alignment bin map based on the movement of the first object within the first perspective comprises: determining a first angle of a first snappable line segment of a first perspective bounding box for the first object with respect to a horizontal reference line; and determining a first alignment bin of the first alignment bin map that corresponds to the first angle of the first snappable line segment.

In some implementations, the cross-perspective alignment system 106 further determines the second index associated with the second object within the second alignment bin map by: determining a second angle of a second snappable line segment of a second perspective bounding box for the second object; and determining a second alignment bin of the second alignment bin map that corresponds to the second angle of the second snappable line segment. In some instances, the cross-perspective alignment system 106 further selects the second object for alignment with the first object by: determining that a third alignment bin of the second alignment bin map having a third index that matches the first index associated with the first object is empty of snappable line segments; and determining that the second index associated with the second object is adjacent to the third index within the second alignment bin map. In some cases, the cross-perspective alignment system 106 further selects the second object for alignment with the first object by: determining a first angle difference between the first angle of the first snappable line segment associated with the first object and the second angle of the second snappable line segment associated with the second object; determining a second angle difference between the first angle of the first snappable line segment associated with the first object and a third angle of a third snappable line segment associated with an index that is adjacent to the third index within the second alignment bin map; and determining that the first angle difference is smaller than the second angle difference.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
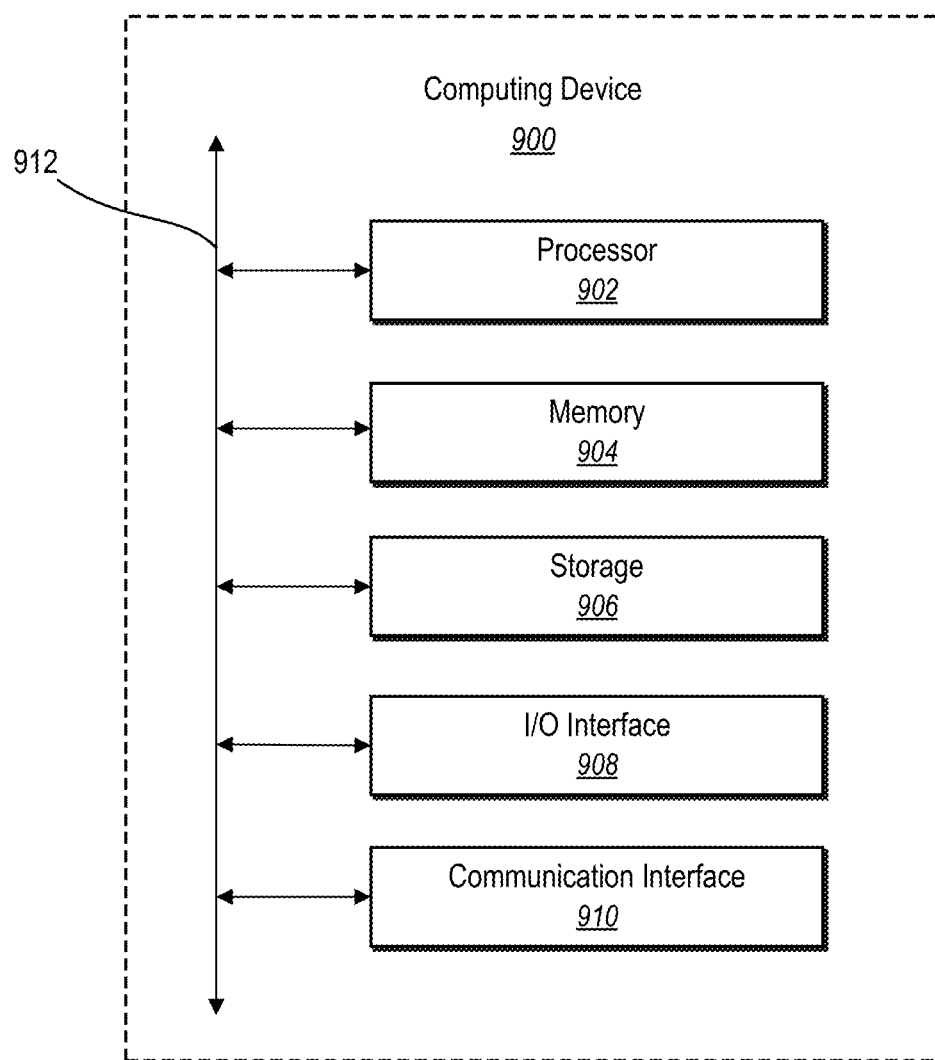
FIG. 9 illustrates a block diagram of an exemplary computing device in accordance with one or more embodiments.

FIG. 9 illustrates a block diagram of an example computing device 900 that may be configured to perform one or more of the processes described above. One will appreciate that one or more computing devices, such as the computing device 900 may represent the computing devices described above (e.g., the server(s) 102 and/or the client devices 110*a*-110*n*). In one or more embodiments, the computing device 900 may be a mobile device (e.g., a mobile telephone, a smartphone, a PDA, a tablet, a laptop, a camera, a tracker, a watch, a wearable device). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 including storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of computing device 900 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
   detecting one or more user interactions for moving a first object within a first perspective of a digital image;
   determining a modified alignment of the first object within the first perspective by mapping an alignment of a second object portrayed within a second perspective of the digital image to the first perspective; and
   modifying the digital image by positioning the first object within the first perspective in accordance with the modified alignment.

2. The method of claim 1,
   further comprising generating a first alignment bin map for the first perspective and a second alignment bin map for the second perspective,
   wherein determining the modified alignment of the first object within the first perspective comprises determining the modified alignment of the first object within the first perspective utilizing the first alignment bin map and the second alignment bin map.

3. The method of claim 2, wherein generating the first alignment bin map for the first perspective comprises:
   determining a tolerance angle with respect to a horizontal reference line; and
   dividing the first perspective into a plurality of alignment bins using the tolerance angle.

4. The method of claim 3, further comprising:
   determining a tolerance distance; and
   determining a horizontal line that is positioned at a vertical distance from the horizontal reference line equal to the tolerance distance at a point where the first perspective meets the second perspective,
   wherein determining the tolerance angle comprises determining an angle between the horizontal line and the horizontal reference line.

5. The method of claim 2, further comprising:
   determining an index associated with the first object within the first alignment bin map based on movement of the first object within the first perspective; and determining an index associated with the second object within the second alignment bin map based on an angle of a snappable line segment of a perspective bounding box for the second object with respect to a horizontal reference line, wherein determining the modified alignment of the first object within the first perspective utilizing the first alignment bin map and the second alignment bin map comprises determining the modified alignment of the first object within the first perspective utilizing the index associated with the first object and the index associated with the second object.

6. The method of claim 1, further comprising:
determining a first measure of collinearity between a segment of the first object and a segment of the second object;
determining a second measure of collinearity between the segment of the first object and a segment of a third object portrayed within the second perspective; and
selecting the second object for alignment with the first object upon based on comparing the first measure of collinearity and the second measure of collinearity.

7. The method of claim 1, further comprising generating, for display within a graphical user interface of a client device displaying the digital image, a perspective guide indicating a positioning of the first object within the first perspective in accordance with the modified alignment.

8. The method of claim 1, wherein positioning the first object within the first perspective in accordance with the modified alignment comprises snapping the first object to a location within the first perspective that aligns the first object with the second object in accordance with the modified alignment.

9. A non-transitory computer-readable medium storing executable instructions, which when executed by a processing device, cause the processing device to perform operations comprising:
detecting one or more user interactions for moving a first object within a first perspective of a digital image;
determining a modified alignment of the first object within the first perspective by mapping an alignment of a second object portrayed within a second perspective of the digital image to the first perspective; and
modifying the digital image by positioning the first object within the first perspective in accordance with the modified alignment.

10. The non-transitory computer-readable medium of claim 9, wherein:
the operations further comprise extracting one or more snappable line segments from a perspective bounding box for the first object, the one or more snappable line segments oriented in accordance with the first perspective; and
determining the modified alignment of the first object within the first perspective comprises determining the modified alignment using at least one snappable line segment from the one or more snappable line segments.

11. The non-transitory computer-readable medium of claim 10, wherein determining the modified alignment using the at least one snappable line segment from the one or more snappable line segments comprises:
determining an angle of the at least one snappable line segment of the first object with respect to a horizontal reference line based on movement of the first object within the first perspective; and
selecting the second object for alignment with the first object using the angle of the at least one snappable line segment of the first object.

12. The non-transitory computer-readable medium of claim 11, wherein the operations further comprise:
extracting one or more additional snappable line segments from an additional perspective bounding box for the second object, the one or more additional snappable line segments oriented in accordance with the second perspective;
determining an additional angle of at least one additional snappable line segment from the one or more additional snappable line segments with respect to the horizontal reference line; and
selecting the second object for alignment with the first object using the additional angle of the at least one additional snappable line segment.

13. The non-transitory computer-readable medium of claim 12, wherein selecting the second object for alignment with the first object using the angle of the at least one snappable line segment of the first object and the additional angle of the at least one additional snappable line segment of the second object comprises selecting the second object for alignment with the first object upon determining that the angle of the at least one snappable line segment equals the additional angle of the at least one additional snappable line segment.

14. The non-transitory computer-readable medium of claim 9, wherein:
the operations further comprise:
determining a horizontal reference line for the digital image;
determining a tolerance angle with respect to the horizontal reference line; and
generating, utilizing the tolerance angle, a first alignment bin map for the first perspective and a second alignment bin map for the second perspective; and
determining the modified alignment of the first object within the first perspective comprises determining the modified alignment using the first alignment bin map and the second alignment bin map.

15. The non-transitory computer-readable medium of claim 14, wherein generating, utilizing the tolerance angle, the first alignment bin map for the first perspective and the second alignment bin map for the second perspective comprises, for each of the first perspective and the second perspective:
determining a first alignment bin bounded by a first horizontal line and the horizontal reference line, wherein the first horizontal line is at an angle to the horizontal reference line that equals the tolerance angle; and
determining a second alignment bin that is bounded by a second horizontal line and the first horizontal line, wherein the second horizontal line is at an angle to the horizontal reference line that equals double the tolerance angle.

16. A system comprising:
one or more memory components; and
one or more processing devices coupled to the one or more memory components, the one or more processing devices to perform operations comprising:
generating a first alignment bin map for a first perspective of a digital image and a second alignment bin map for a second perspective of the digital image;
determining a first index associated with a first object portrayed within the first perspective of the digital image within the first alignment bin map based on movement of the first object within the first perspective;

determining a modified alignment of the first object within the first perspective by mapping an alignment of a second object portrayed within the second perspective of the digital image to the first perspective using the first index associated with the first object within the first alignment bin map and a second index associated with the second object within the second alignment bin map; and modifying the digital image by positioning the first object within the first perspective in accordance with the modified alignment.

17. The system of claim 16, wherein determining the first index associated with the first object within the first alignment bin map based on the movement of the first object within the first perspective comprises:

determining a first angle of a first snappable line segment of a first perspective bounding box for the first object with respect to a horizontal reference line; and determining a first alignment bin of the first alignment bin map that corresponds to the first angle of the first snappable line segment.

18. The system of claim 17, wherein the one or more processing devices further perform operations comprising determining the second index associated with the second object within the second alignment bin map by:

determining a second angle of a second snappable line segment of a second perspective bounding box for the second object; and determining a second alignment bin of the second alignment bin map that corresponds to the second angle of the second snappable line segment.

19. The system of claim 18, wherein the one or more processing devices further perform operations comprising selecting the second object for alignment with the first object by:

determining that a third alignment bin of the second alignment bin map having a third index that matches the first index associated with the first object is empty of snappable line segments; and determining that the second index associated with the second object is adjacent to the third index within the second alignment bin map.

20. The system of claim 19, wherein the one or more processing devices further perform operations comprising selecting the second object for alignment with the first object by:

determining a first angle difference between the first angle of the first snappable line segment associated with the first object and the second angle of the second snappable line segment associated with the second object;

determining a second angle difference between the first angle of the first snappable line segment associated with the first object and a third angle of a third snappable line segment associated with an index that is adjacent to the third index within the second alignment bin map; and determining that the first angle difference is smaller than the second angle difference.

\* \* \* \* \*